United States Patent
Lin et al.

(10) Patent No.: US 10,643,370 B2
(45) Date of Patent: May 5, 2020

(54) METHOD AND APPARATUS FOR GENERATING PROJECTION-BASED FRAME WITH 360-DEGREE IMAGE CONTENT REPRESENTED BY TRIANGULAR PROJECTION FACES ASSEMBLED IN OCTAHEDRON PROJECTION LAYOUT

(71) Applicant: MEDIATEK INC., Hsin-Chu (TW)

(72) Inventors: Jian-Liang Lin, Yilan County (TW);
Hung-Chih Lin, Nantou County (TW);
Chia-Ying Li, Taipei (TW); Shen-Kai Chang, Hsinchu County (TW);
Chi-Cheng Ju, Hsinchu (TW);
Chao-Chih Huang, Hsinchu County (TW); Hui Ouyang, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 2 days.

(21) Appl. No.: 15/769,750

(22) PCT Filed: Sep. 30, 2017

(86) PCT No.: PCT/CN2017/104745
§ 371 (c)(1),
(2) Date: Apr. 20, 2018

(87) PCT Pub. No.: WO2018/064965
PCT Pub. Date: Apr. 12, 2018

(65) Prior Publication Data
US 2019/0088001 A1 Mar. 21, 2019

Related U.S. Application Data

(60) Provisional application No. 62/430,968, filed on Dec. 7, 2016, provisional application No. 62/405,290, filed on Oct. 7, 2016.

(51) Int. Cl.
*G06T 3/00* (2006.01)
*G06T 15/04* (2011.01)
(Continued)

(52) U.S. Cl.
CPC ............ *G06T 15/04* (2013.01); *G06T 3/0031* (2013.01); *G06T 3/0093* (2013.01); *G06T 15/08* (2013.01); *H04N 13/00* (2013.01)

(58) Field of Classification Search
None
See application file for complete search history.

(56) References Cited

U.S. PATENT DOCUMENTS 6,141,034 A 10/2000 McCutchen
6,144,773 A 11/2000 Kolarov
(Continued)

FOREIGN PATENT DOCUMENTS

CN 1491403 A 4/2004
CN 101606177 A 12/2009
(Continued)

OTHER PUBLICATIONS

"International Search Report" dated Dec. 28, 2017 for International application No. PCT/CN2017/104849, International filing date:Sep. 30, 2017.
(Continued)

*Primary Examiner* — Andrew G Yang
(74) *Attorney, Agent, or Firm* — Winston Hsu

(57) ABSTRACT

A projection-based frame is generated according to an omnidirectional video frame and an octahedron projection layout. The projection-based frame has a 360-degree image content represented by triangular projection faces assembled in the octahedron projection layout. A 360-degree image content of a viewing sphere is mapped onto the triangular projection faces via an octahedron projection of the viewing (Continued)

sphere. One side of a first triangular projection face has contact with one side of a second triangular projection face, one side of a third triangular projection face has contact with another side of the second triangular projection face. One image content continuity boundary exists between one side of the first triangular projection face and one side of the second triangular projection face, and another image content continuity boundary exists between one side of the third triangular projection face and another side of the second triangular projection face.

20 Claims, 19 Drawing Sheets

(51) Int. Cl.
*H04N 13/00* (2018.01)
*G06T 15/08* (2011.01)

(56) References Cited

U.S. PATENT DOCUMENTS

| | | | |
|---|---|---|---|
| 6,466,254 | B1 | 10/2002 | Furlan |
| 10,380,715 | B2 | 8/2019 | Lin |
| 10,462,484 | B2 | 10/2019 | Lin |
| 2004/0105597 | A1 | 6/2004 | Lelescu |
| 2006/0251336 | A1 | 11/2006 | Lelescu |
| 2006/0257032 | A1 | 11/2006 | Nakagawa |
| 2009/0123088 | A1 | 5/2009 | Kallay |
| 2010/0001997 | A1 | 1/2010 | Kajikawa |
| 2010/0086023 | A1 | 4/2010 | Cheung |
| 2013/0185353 | A1 | 7/2013 | Rondao Alface |
| 2015/0341552 | A1 | 11/2015 | Chen |
| 2016/0071240 | A1* | 3/2016 | Liu .................. H04N 5/2628 345/592 |
| 2016/0142697 | A1 | 5/2016 | Budagavi |
| 2017/0155797 | A1* | 6/2017 | Otani ................ G03G 15/5062 |
| 2017/0358126 | A1 | 12/2017 | Lim |
| 2018/0075576 | A1 | 3/2018 | Liu |
| 2018/0158170 | A1 | 6/2018 | Lin |
| 2018/0225876 | A1 | 8/2018 | Lim |
| 2018/0262775 | A1 | 9/2018 | Lee |
| 2018/0332305 | A1 | 11/2018 | Lin |
| 2019/0026858 | A1 | 1/2019 | Lin |
| 2019/0325553 | A1 | 10/2019 | Lin |

FOREIGN PATENT DOCUMENTS

| | | |
|---|---|---|
| CN | 101853621 A | 10/2010 |
| CN | 102481487 A | 5/2012 |
| CN | 102938018 A | 2/2013 |
| CN | 105164998 A | 12/2015 |
| CN | 105898254 A | 8/2016 |
| CN | 105898359 A | 8/2016 |
| EP | 3 446 282 A1 | 2/2019 |
| JP | 2016-42629 A | 3/2016 |
| TW | 201101077 A1 | 1/2011 |
| TW | 201633104 A | 9/2016 |
| WO | 2016/140082 A1 | 9/2016 |

OTHER PUBLICATIONS

"International Search Report" dated Dec. 28, 2017 for International application No. PCT/CN2017/104745, International filing date:Sep. 30, 2017.

Zhang, Chunxiao et al., Intermediate Cubic-Panorama Synthesis Based on Triangular Re-Projection, Proceedings of 2010 IEEE 17th International Conference on Image Processing, p. 3985-3988., Sep. 29, 2010.

"International Search Report" dated Feb. 24, 2018 for International application No. PCT/CN2017/114681, International filing date:Dec. 6, 2017.

Jian-Liang Lin et al., Title of Invention: Video Encoding Method and Apparatus With Syntax Element Signaling of Employed Projection Layout and Associated Video Decoding Method and Apparatus, U.S. Appl. No. 15/772,818, filed May 2, 2018.

Aljoscha Smolić and David McCutchen,"3DAV Exploration of Video-Based Rendering Technology in MPEG", IEEE Transactions on Circuits and Systems for Video Technology, vol. 14, No. 3, Mar. 2004, pp. 348-356.

Thomas Engelhardt et al., Octahedron Environment Maps, VMV 2008, http://www.vis.uni-stuttgart.de/~engelhts/paper/vmv0ctaMaps.pdf, XP055432198, Jan. 2008.

Emil Praun et al., Spherical Parametrization and Remeshing, Jul. 2003, pp. 340-349, XP058134301.

Yuwen He et al., AHG8: InterDigital's projection format conversion tool, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-12, Document: JVET-D0021, XP030150243.

Philippe Hanhart et al., AHG8: High level syntax extensions for signaling of 360-degree video information, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6, Document: JVET-D0093, XP030150330.

* cited by examiner

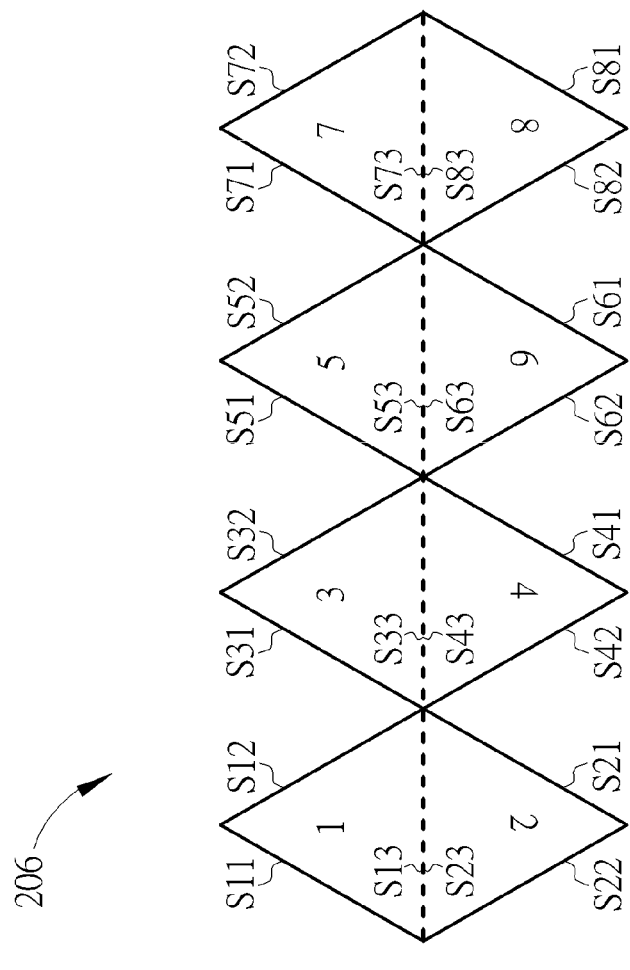
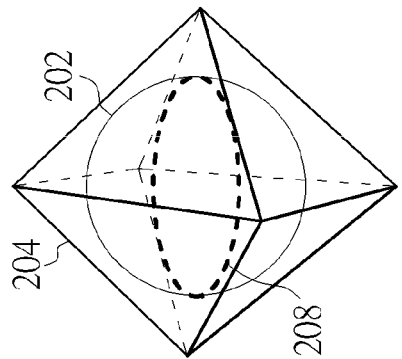
FIG. 2

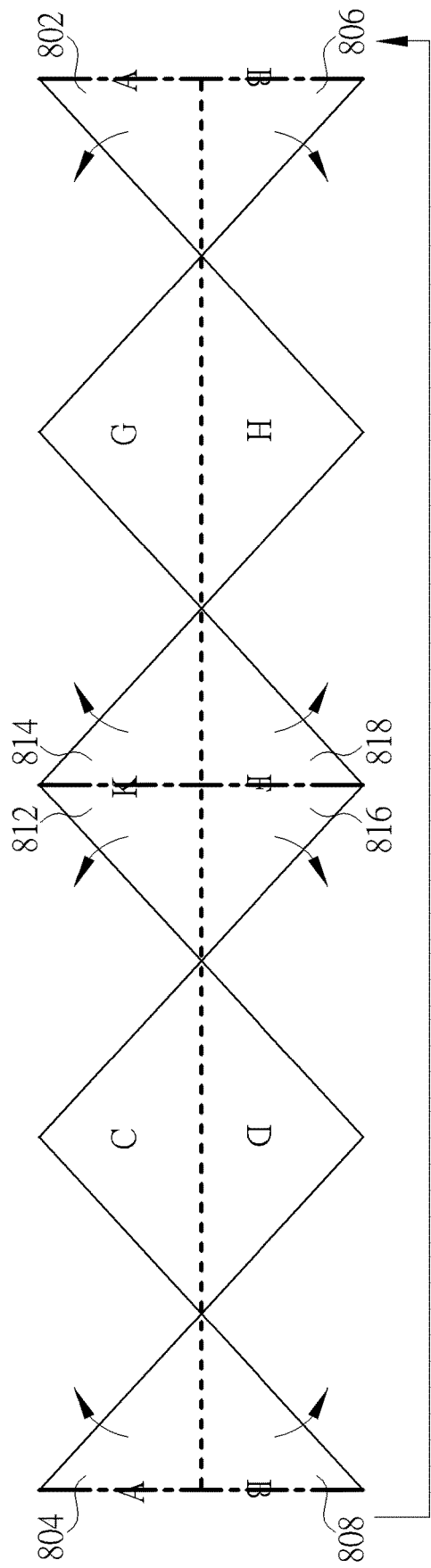
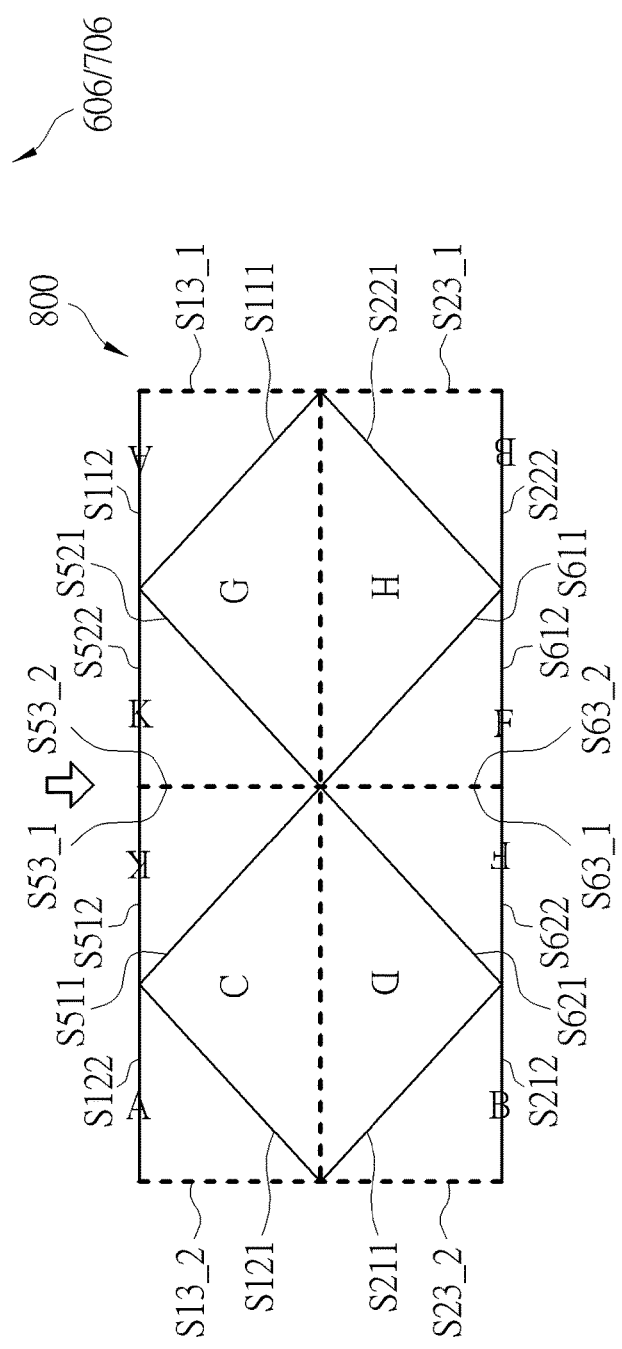
FIG. 8

METHOD AND APPARATUS FOR GENERATING PROJECTION-BASED FRAME WITH 360-DEGREE IMAGE CONTENT REPRESENTED BY TRIANGULAR PROJECTION FACES ASSEMBLED IN OCTAHEDRON PROJECTION LAYOUT

CROSS REFERENCE TO RELATED APPLICATIONS

This application claims the benefit of U.S. provisional application No. 62/405,290 filed on Oct. 7, 2016 and provisional application No. 62/430,968 filed on Dec. 7, 2016. The entire contents of the related applications, including U.S. provisional application No. 62/405,290 and provisional application No. 62/430,968, are incorporated herein by reference.

BACKGROUND

The present invention relates to processing an omnidirectional video frame, and more particularly, to a method and an apparatus for generating a projection-based frame with a 360-degree image content represented by triangular projection faces assembled in an octahedron projection (OHP) layout.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional video corresponding to a viewing sphere. With advances in camera rigs and HMDs, the delivery of VR content may soon become the bottleneck due to the high bitrate required for representing such a 360-degree image content. When the resolution of the omnidirectional video is 4K or higher, data compression/encoding is critical to bitrate reduction.

In general, the omnidirectional video corresponding to a viewing sphere is transformed into a projection-based frame with a 360-degree image content represented by projection faces arranged in a 360-degree Virtual Reality (360 VR) projection layout, and then the projection-based frame is encoded into a bitstream for transmission. However, if the employed 360 VR projection layout is not properly designed, it is possible that the projection-based frame has many image content discontinuity boundaries resulting from assembling of the projection faces. The encoding/decoding quality may be degraded due to the image content discontinuity boundaries.

SUMMARY

One of the objectives of the claimed invention is to provide a method and an apparatus for generating a projection-based frame with a 360-degree image content represented by triangular projection faces assembled in an octahedron projection layout. With a proper design of the octahedron projection layout, the number of image content discontinuity boundaries resulting from assembling of the triangular projection faces can be reduced.

According to a first aspect of the present invention, an exemplary method for generating a projection-based frame is disclosed. The exemplary method includes: receiving an omnidirectional video frame corresponding to a viewing sphere, and generating the projection-based frame according to the omnidirectional video frame and an octahedron projection layout. The projection-based frame has a 360-degree image content represented by triangular projection faces assembled in the octahedron projection layout. A 360-degree image content of the viewing sphere is mapped onto the triangular projection faces via an octahedron projection of the viewing sphere. The triangular projection faces assembled in the octahedron projection layout comprise a first triangular projection face, a second triangular projection face and a third triangular projection face, wherein one side of the first triangular projection face has contact with one side of the second triangular projection face, one side of the third triangular projection face has contact with another side of the second triangular projection face, there is an image content continuity boundary between said one side of the first triangular projection face and said one side of the second triangular projection face, and there is an image content continuity boundary between said one side of the third triangular projection face and said another side of the second triangular projection face.

According to a second aspect of the present invention, an exemplary processing circuit for generating a projection-based frame is disclosed. The exemplary processing circuit includes an input interface and a conversion circuit. The input interface is arranged to receive an omnidirectional video frame corresponding to a viewing sphere. The conversion circuit is arranged to generate the projection-based frame according to the omnidirectional video frame and an octahedron projection layout. The projection-based frame has a 360-degree image content represented by triangular projection faces assembled in the octahedron projection layout. A 360-degree image content of the viewing sphere is mapped onto the triangular projection faces via an octahedron projection of the viewing sphere. The triangular projection faces assembled in the octahedron projection layout comprise a first triangular projection face, a second triangular projection face and a third triangular projection face, wherein one side of the first triangular projection face has contact with one side of the second triangular projection face, one side of the third triangular projection face has contact with another side of the second triangular projection face, there is an image content continuity boundary between said one side of the first triangular projection face and said one side of the second triangular projection face, and there is an image content continuity boundary between said one side of the third triangular projection face and said another side of the second triangular projection face.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating triangular projection faces of an original octahedron projection layout that are obtained from an octahedron projection of a viewing sphere according to an unrotated octahedron.

FIG. 8 is a diagram illustrating a third proposed octahedron projection layout according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
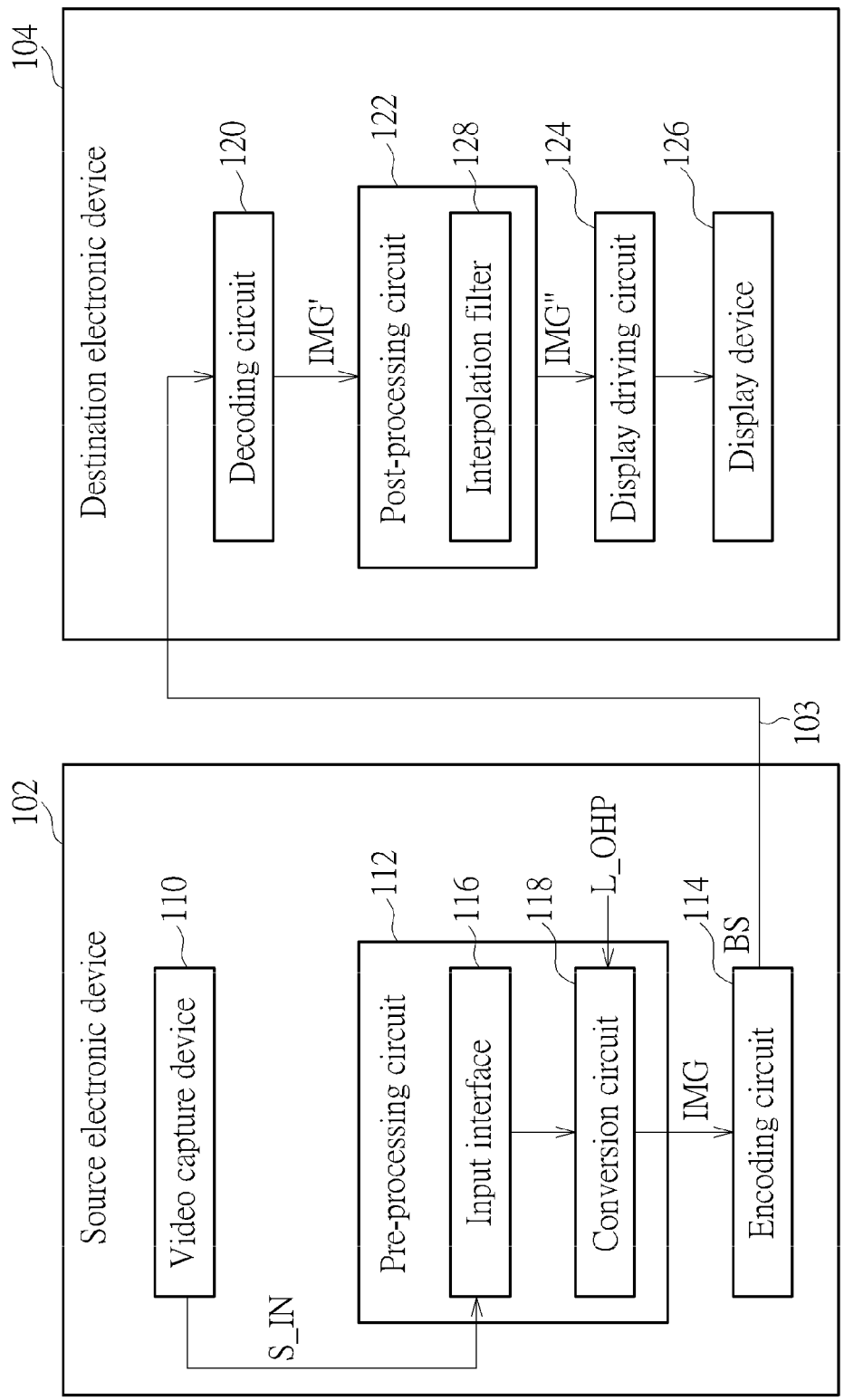
FIG. 1 is a diagram illustrating a 360-degree Virtual Reality system according to an embodiment of the present invention.

FIG. 1 is a diagram illustrating a 360-degree Virtual Reality (360 VR) system according to an embodiment of the present invention. The 360 VR system 100 includes a source electronic device 102 and a destination device 104. The source electronic device 102 includes a video capture device 110, a pre-processing circuit 112, and an encoding circuit 114. For example, the video capture device 110 may be an omnidirectional camera. The pre-processing circuit 112 generates a projection-based frame IMG with a 360-degree Virtual Reality (360 VR) projection layout according to an omnidirectional video frame S_IN corresponding to a viewing sphere. The encoding circuit 114 encodes the projection-based frame IMG to generate a bitstream BS, and outputs the bitstream BS to the destination electronic device 104 via a transmission means 103 such as a wired/wireless communication link or a storage medium.

The destination electronic device 104 may be a head-mounted display device. As shown in FIG. 1, the destination electronic device 104 includes a decoding circuit 120, a post-processing circuit 122, a display driving circuit 124, and a display device 126. The decoding circuit 120 receives the bitstream BS from the transmission means 103 (e.g., a wired/wireless communication link or a storage medium), and decodes the received bitstream BS to generate a decoded frame IMG'. In this embodiment, the frame IMG to be encoded by the encoding circuit 114 has a 360 VR projection layout. Hence, after the bitstream BS is decoded by the decoding circuit 120, the decoded frame (i.e., reconstructed frame) IMG' has the same 360 VR projection layout. The post-processing circuit 122 may process the decoded frame IMG' to transform the decoded frame IMG' with the 360 VR projection layout into a post-processed frame IMG" with a different 360 VR projection layout for further processing. However, this is for illustrative purposes only, and is not meant to be a limitation of the present invention. A viewport area associated with a portion of a 360-degree image content carried by post-processed frame IMG' (or decoded frame IMG') may be displayed on the display device 126 via the display driving circuit 124.

The present invention proposes an innovative octahedron projection layout design with a reduced number of image content discontinuity boundaries resulting from assembling of triangular projection faces or without image content discontinuity boundaries resulting from assembling of triangular projection faces. As shown in FIG. 1, the pre-processing circuit 112 includes an input interface 116 and a conversion circuit 118. The input interface 116 communicates with the video capture device 110, and receives the omnidirectional video frame S_IN corresponding to a viewing sphere from the video capture device 110. The frame IMG to be encoded by the video encoder 100 has a 360-degree image content represented by projection faces arranged in a 360 VR projection layout. In this embodiment, the aforementioned 360 VR projection layout is an octahedron projection layout L_OHP having triangular projection faces assembled therein. Hence, the conversion circuit 118 refers to the octahedron projection layout L_OHP and the omnidirectional video frame (e.g., a spherical image) S_IN to generate the projection-based frame IMG. Specifically, a 360-degree image content of the viewing sphere is mapped onto triangular projection faces via an octahedron projection of the viewing sphere.

FIG. 2 is a diagram illustrating triangular projection faces of an original octahedron projection layout that are obtained from an octahedron projection of a viewing sphere according to an unrotated octahedron. A 360-degree image content of a viewing sphere 202 is mapped onto triangular projection faces (labeled by reference numbers "1", "2", "3", "4", "5", "6", "7" and "8") of an unrotated octahedron 204. As shown in FIG. 2, the triangular projection faces "1"-"8" are assembled in an original octahedron projection layout 206. A shape of each of the triangular projection faces "1"-"8" is an equilateral triangle. The triangular projection face "1" has three sides S11, S12, S13. The triangular projection face "2" has three sides S21, S22, S23. The triangular projection face "3" has three sides S31, S32, S33. The triangular projection face "4" has three sides S41, S42, S43. The triangular projection face "5" has three sides S51, S52, S53. The triangular projection face "6" has three sides S61, S62, S63. The triangular projection face "7" has three sides S71, S72, S73. The triangular projection face "8" has three sides S81, S82, S83. The viewing sphere 202 is composed of a top hemisphere (e.g., a northern hemisphere) and a bottom hemisphere (e.g., a southern hemisphere). Due to octahedron projection based on the unrotated octahedron 204, an equator 208 of the viewing sphere 202 is mapped along sides S13, S23, S33, S43, S53, S63, S73 and S83 of the triangular projection faces "1"-"8", where the triangular projection faces "1", "3", "5", "7" are all derived from the top hemisphere, and the triangular projection faces "2", "4", "6", "8" are all derived from the bottom hemisphere.

The projection-based frame IMG to be encoded is required to be rectangular. If the original octahedron projection layout 206 is directly used for creating the projection-based frame IMG, the projection-based frame IMG is unable to have a compact size due to many dummy areas (e.g., black areas or white areas) filled in the projection-based frame IMG. Thus, there is a need for a compact octahedron projection layout that can reduce/avoid the dummy areas (e.g., black areas or white areas) as well as the image content discontinuity boundaries resulting from assembling of the triangular projection faces.

Figure 3:
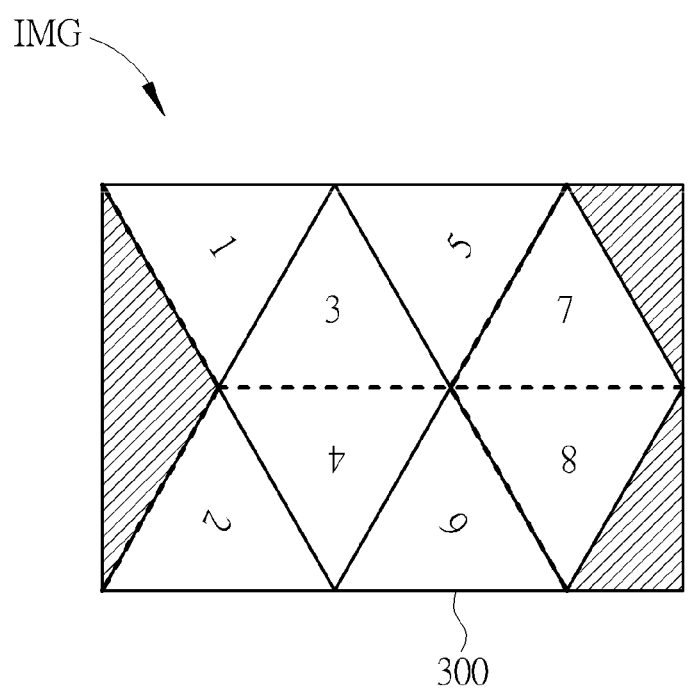
FIG. 3 is a diagram illustrating a first proposed octahedron projection layout according to an embodiment of the present invention.

Please refer to FIG. 2 in conjunction with FIG. 3. FIG. 3 is a diagram illustrating a first proposed octahedron projection layout according to an embodiment of the present invention. As mentioned above, the equator 208 of the viewing sphere 202 is mapped along sides S13, S23, S33, S43, S53, S63, S73 and S83 of the triangular projection faces "1"-"8". The equator 208 is indicated by broken lines in FIG. 3. The first proposed octahedron projection layout 300 can be derived from the original octahedron projection layout 206 with the triangular projection face "1" rotated by 60° clockwise, the triangular projection face "2" rotated by 60° counterclockwise, the triangular projection face "5" rotated by 60° counterclockwise, and the triangular projection face "6" rotated by 60° clockwise. Hence, in accordance with the first proposed octahedron projection layout 300, the side S12 of the triangular projection face "1" has contact with the side S31 of the triangular projection face "3", the side S32 of the triangular projection face "3" has contact with the side S51 of the triangular projection face "5", the side S33 of the triangular projection face "3" has contact with the side S43 of the triangular projection face "4", the side S53 of the triangular projection face "5" has contact with the side S71 of the triangular projection face "7", the side S73 of the triangular projection face "7" has contact with the side S83 of the triangular projection face "8", the side S21 of the triangular projection face "2" has contact with the side S42 of the triangular projection face "4", the side S41 of the triangular projection face "4" has contact with the side S62 of the triangular projection face "6", and the side S63 of the triangular projection face "6 has contact with the side S82 of the triangular projection face "8".

As can be seen from FIG. 3, an image content continuity boundary exists between the side S12 of the triangular projection face "1" and the side S31 of the triangular projection face "3", an image content continuity boundary exists between the side S32 of the triangular projection face "3" and the side S51 of the triangular projection face "5", an image content continuity boundary exists between the side S33 of the triangular projection face "3" and the side S43 of the triangular projection face "4", an image content continuity boundary exists between the side S21 of the triangular projection face "2" and the side S42 of the triangular projection face "4", an image content continuity boundary exists between the side S41 of the triangular projection face "4" and the side S62 of the triangular projection face "6", and an image content continuity boundary exists between the side S73 of the triangular projection face "7" and the side S83 of the triangular projection face "8".

It should be noted that an image content discontinuity boundary exists between the side S53 of the triangular projection face "5" and the side S71 of the triangular projection face "7", and an image content discontinuity boundary exists between the side S63 of the triangular projection face "6" and the side S82 of the triangular projection face "8". Further, due to filling of dummy areas (e.g., black areas or white areas) that are indicated by shaded areas, a picture boundary (which is a discontinuity edge) exists along the side S13 of the triangular projection face "5", a picture boundary (which is a discontinuity edge) exists along the side S23 of the triangular projection face "2", a picture boundary (which is a discontinuity edge) exists along the side S72 of the triangular projection face "7", and a picture boundary (which is a discontinuity edge) exists along the side S81 of the triangular projection face "8".

When the projection-based image IMG has a 360-degree image content represented by the triangular projection faces "1"-"8" assembled in the first proposed octahedron projection layout 300 shown in FIG. 3, the projection-based image IMG has a compact size as well as a reduced number of image content discontinuity boundaries resulting from assembling of the triangular projection faces "1"-"8".

When the octahedron projection layout L_OHP is set by the first proposed octahedron projection layout 300 shown in FIG. 3, some dummy areas (e.g., black areas or white areas) are needed to make the projection-based image IMG have a rectangular shape. If a shape of the octahedron projection layout L_OHP is a rectangle, the dummy areas (e.g., black areas or white areas) can be omitted, thus allowing the projection-based image IMG to have a more compact size.

Figure 4:
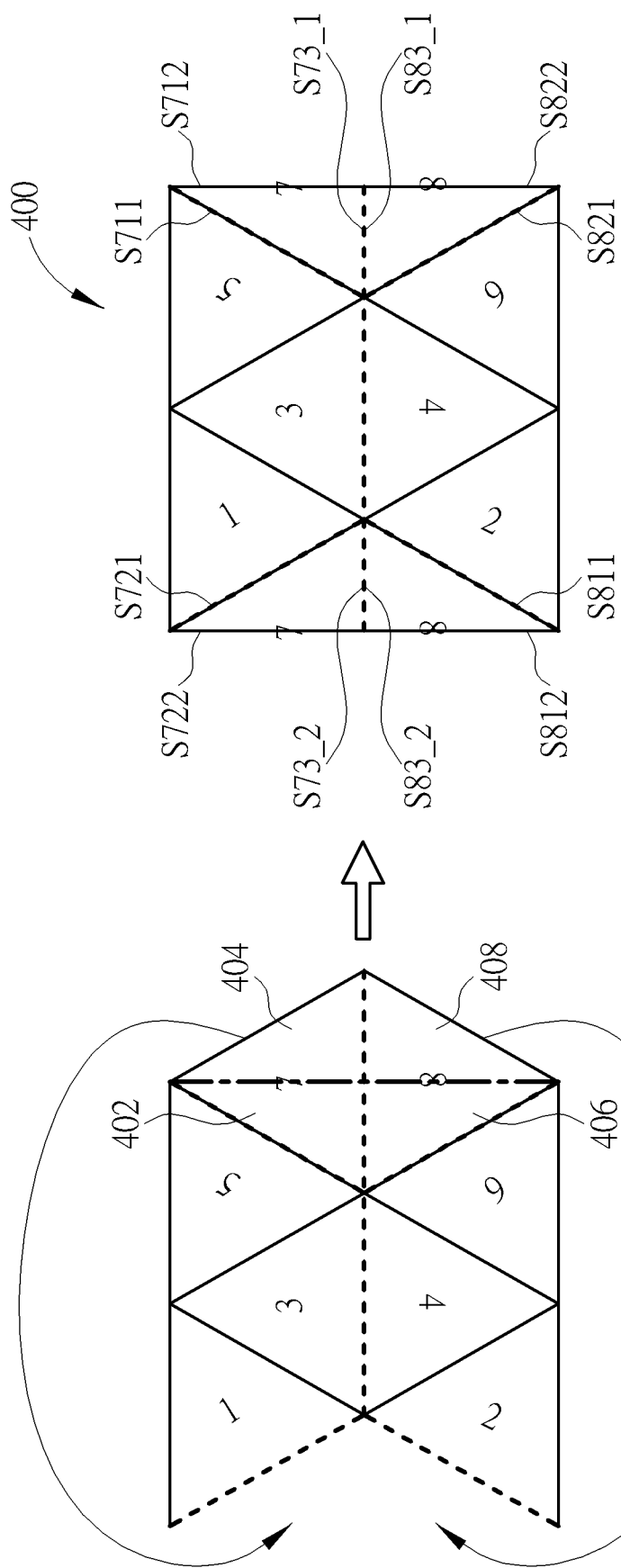
FIG. 4 is a diagram illustrating a second proposed octahedron projection layout according to an embodiment of the present invention.

Please refer to FIG. 4 in conjunction with FIG. 3. FIG. 4 is a diagram illustrating a second proposed octahedron projection layout according to an embodiment of the present invention. The second proposed octahedron projection layout 400 can be derived from the first proposed octahedron projection layout 300 with the triangular projection face "7" split into a first right-triangle-shaped part 402 and a second right-triangle-shaped part 404, and the triangular projection face "8" split into a first right-triangle-shaped part 406 and a second right-triangle-shaped part 408. As shown in FIG. 4, the second right-triangle-shaped part 404 of the triangular projection face "7" and the second right-triangle-shaped part 408 of the triangular projection face "8" are relocated to be adjacent to the triangular projection faces "1" and 2, respectively.

The first right-triangle-shaped part 402 of the triangular projection face "7" has three sides S711, S712, S73_1, where the side S711 is the side S71 of the triangular projection face "7", and the side S73_1 is a first part of the side S73 of the triangular projection face "7". The second right-triangle-shaped part 404 of the triangular projection face "7" has three sides S721, S722, S73_2, where the side S721 is the side S72 of the triangular projection face "7", and the side S73_2 is a second part of the side S73 of the triangular projection face "7". The first right-triangle-shaped part 404 of the triangular projection face "8" has three sides S821, S822, S83_1, where the side S821 is the side S82 of the triangular projection face "8", and the side S83_1 is a first part of the side S83 of the triangular projection face "8". The second right-triangle-shaped part 406 of the triangular projection face "8" has three sides S811, S812, S83_2, where the side S811 is the side S81 of the triangular projection face "8", and the side S83_2 is a second part of the side S83 of the triangular projection face "8".

In accordance with the second proposed octahedron projection layout 400, the side S711 of the first right-triangle-shaped part 402 of the triangular projection face "7" has contact with the side S53 of the triangular projection face "5", the side S73_1 of the first right-triangle-shaped part 402 of the triangular projection face "7" has contact with the side S83_1 of the first right-triangle-shaped part 406 of the triangular projection face "8", the side S821 of the first right-triangle-shaped part 406 of the triangular projection face "8" has contact with the side S63 of the triangular projection face "6", the side S721 of the second right-triangle-shaped part 404 of the triangular projection face "7" has contact with the side S13 of the triangular projection face "1", the side S73_2 of the second right-triangle-shaped part 404 of the triangular projection face "7" has contact with the side S83_2 of the second right-triangle-shaped part 408 of the triangular projection face "8", and the side S811 of the second right-triangle-shaped part 408 of the triangular projection face "8" has contact with the side S23 of the triangular projection face "2".

An image content continuity boundary exists between the side S73_1 of the first right-triangle-shaped part 402 of the triangular projection face "7" and the side S83_1 of the first right-triangle-shaped part 406 of the triangular projection face "8". An image content continuity boundary exists between the side S73_2 of the second right-triangle-shaped part 404 of the triangular projection face "7" and the side S83_2 of the second right-triangle-shaped part 408 of the triangular projection face "8". Further, an image content discontinuity boundary exists between the side S711 of the first right-triangle-shaped part 402 of the triangular projection face "7" and the side S53 of the triangular projection face "5", an image content discontinuity boundary exists between the side S821 of the first right-triangle-shaped part 406 of the triangular projection face "8" and the side S63 of the triangular projection face "6", an image content discontinuity boundary exists between the side S721 of the second right-triangle-shaped part 404 of the triangular projection face "7" and the side S13 of the triangular projection face "1", and an image content discontinuity boundary exists between the side S811 of the second right-triangle-shaped part 408 of the triangular projection face "8" and the side S23 of the triangular projection face "2". It should be noted that dummy areas are not needed to be filled into the projection-based frame IMG when the projection-based frame IMG is generated based on the second proposed octahedron projection layout 400. Hence, the projection-based frame IMG has no picture boundaries (which are discontinuity edges) resulting from filling of dummy areas.

As can be seen from FIG. 4, a shape of the second proposed octahedron projection layout 400 is a rectangle. Hence, when the octahedron projection layout L_OHP is set by the second proposed octahedron projection layout 400, a size of the projection-based frame IMG is same as the size of the second proposed octahedron projection layout 400. In this way, the projection-based image IMG can have a more compact size due to omission of dummy areas (e.g., black areas or white areas).

In any of the first proposed octahedron projection layout 300 and the second proposed octahedron projection layout 400, a shape of each of the triangular projection faces "1"-"8" is an equilateral triangle. Hence, it is impossible to assemble the triangular projection faces "1"-"8" without introducing image content discontinuity boundaries. If a shape of each of the triangular projection faces can be an isosceles right triangle, the number of image content discontinuity boundaries resulting from assembling of the triangular projection faces in an octahedron projection layout can be further reduced.

Figure 5:
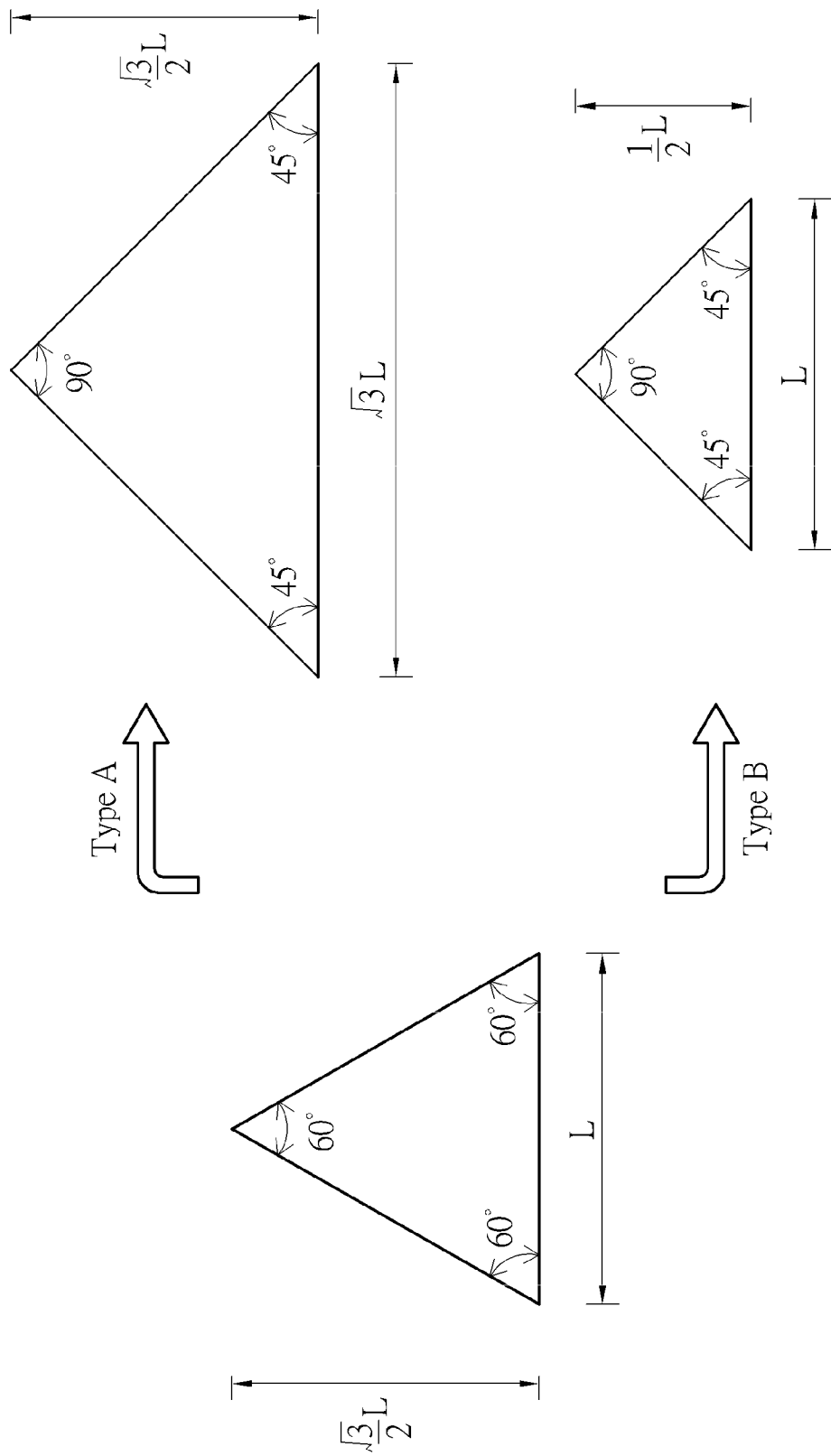
FIG. 5 is a diagram illustrating two types of the reshaped triangle according to an embodiment of the present invention.

A triangular projection face with a shape of an equilateral triangle may be reshaped to have a shape of an isosceles right triangle. There are two types of the reshaped triangle, as illustrated in FIG. 5. Regarding generation of a Type-A reshaped triangle, the height $$\frac{\sqrt{3}}{2}L$$

of the equilateral triangle remains unchanged, while the length L of the base-side of the equilateral triangle is lengthened to be $\sqrt{2}L$, thus resulting in each base angle being 45°. Regarding generation of a Type-B reshaped triangle, the length L of the base-side of the equilateral triangle remains unchanged, while the height $$\frac{\sqrt{3}}{2}L$$

of the equilateral triangle is shortened to be ½L, thus resulting in each base angle being 45°.

Figure 6:
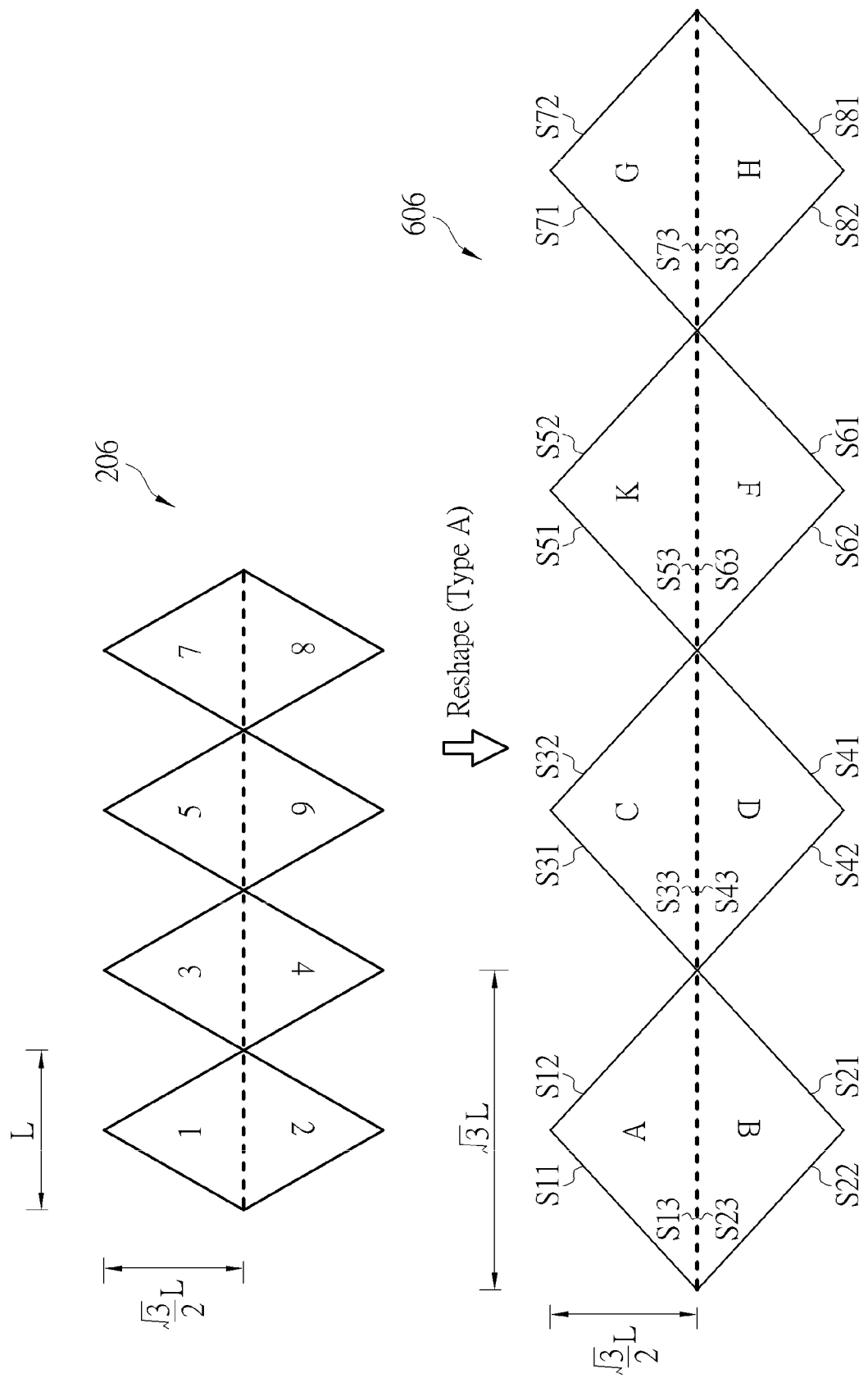
FIG. 6 is diagram illustrating a first reshaped octahedron projection layout according to an embodiment of the present invention.

FIG. 6 is diagram illustrating a first reshaped octahedron projection layout according to an embodiment of the present invention. After each triangular projection face of the original octahedron projection layout 206 is reshaped to be a Type-A reshaped triangle, a reshaped octahedron projection layout 606 composed of triangular projection faces (labeled by reference characters "A", "B", "C", "D", "K", "F", "G" and "H") is obtained, where a shape of each of the triangular projection faces "A"-"H" is an isosceles right triangle. The triangular projection face "A" has three sides S11, S12, and S13. The triangular projection face "B" has three sides S21, S22, and S23. The triangular projection face "C" has three sides S31, S32, and S33. The triangular projection face "D" has three sides S41, S42, and S43. The triangular projection face "K" has three sides S51, S52, and S53. The triangular projection face "F" has three sides S61, S62, and S63. The triangular projection face "G" has three sides S71, S72, and S73. The triangular projection face "H" has three sides S81, S82, and S83. It should be noted that the equator 208 of the viewing sphere 202 is mapped along sides S13, S23, S33, S43, S53, S63, S73 and S83 of the triangular projection faces "A"-"H", as indicated by broken lines in FIG. 6. The triangular projection faces "A", "C", "K", "G" are all derived from the top hemisphere (e.g., northern hemisphere) of the viewing sphere 202, and the triangular projection faces "B", "D", "F", "H" are all derived from the bottom hemisphere (e.g., southern hemisphere) of the viewing sphere 202.

Figure 7:
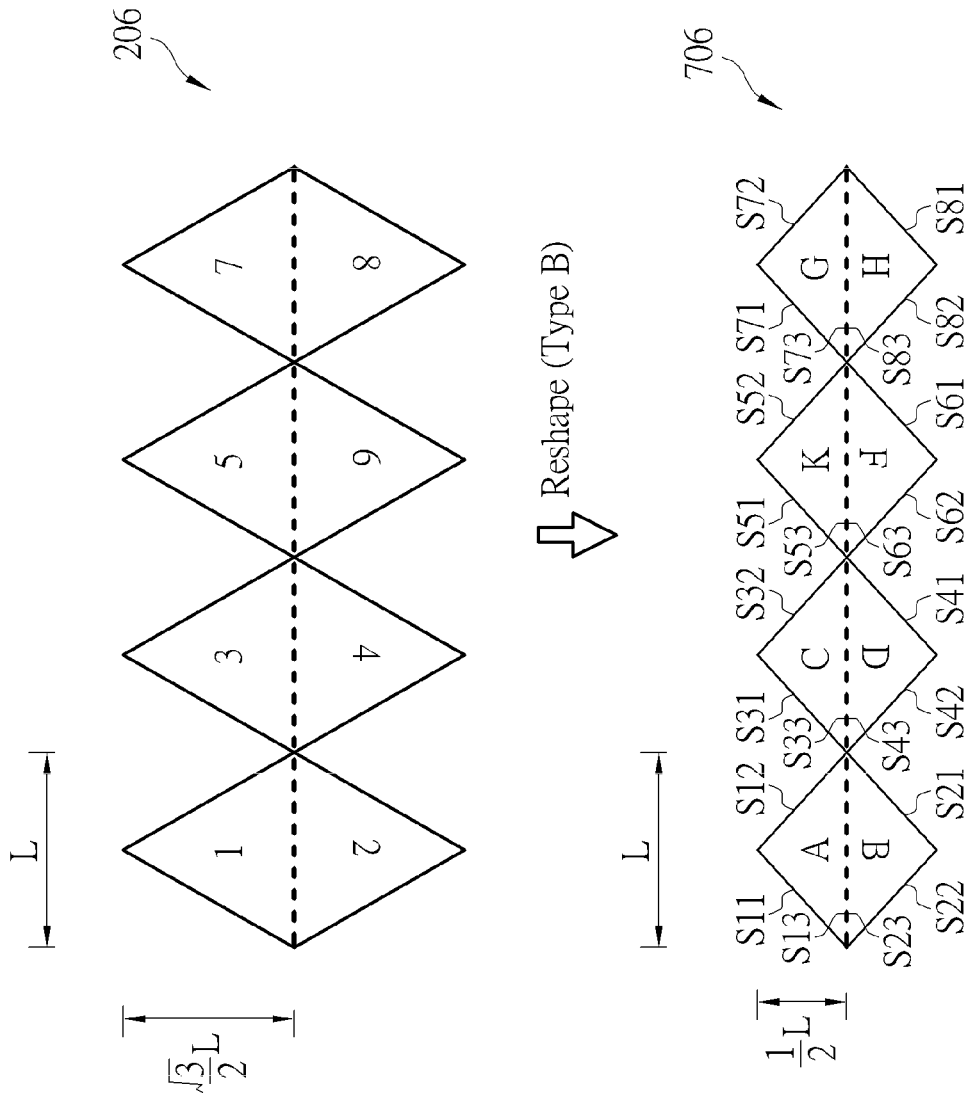
FIG. 7 is diagram illustrating a second reshaped octahedron projection layout according to an embodiment of the present invention.

FIG. 7 is diagram illustrating a second reshaped octahedron projection layout according to an embodiment of the present invention. After each triangular projection face of the original octahedron projection layout 206 is reshaped to be a Type-B reshaped triangle, a reshaped octahedron projection layout 706 composed of triangular projection faces (labeled by reference characters "A", "B", "C", "D", "K", "F", "G" and "H") is obtained, where a shape of each of the triangular projection faces "A"-"H" is an isosceles right triangle. The triangular projection face "A" has three sides S11, S12, and S13. The triangular projection face "B" has three sides S21, S22, and S23. The triangular projection face "C" has three sides S31, S32, and S33. The triangular projection face "D" has three sides S41, S42, and S43. The triangular projection face "K" has three sides S51, S52, and S53. The triangular projection face "F" has three sides S61, S62, and S63. The triangular projection face "G" has three sides S71, S72, and S73. The triangular projection face "H" has three sides S81, S82, and S83. It should be noted that the equator 208 of the viewing sphere 202 is mapped along sides S13, S23, S33, S43, S53, S63, S73 and S83 of the triangular projection faces "A"-"H", as indicated by broken lines in FIG. 7. The triangular projection faces "A", "C", "K", "G" are all derived from the top hemisphere (e.g., northern hemisphere) of the viewing sphere 202, and the triangular projection faces "B", "D", "F", "H" are all derived from the bottom hemisphere (e.g., southern hemisphere) of the viewing sphere 202.

The triangular projection faces "A"-"H" of the reshaped octahedron projection layout 606/706 can be properly rearranged to produce a compact octahedron projection layout.

Please refer to FIG. 8 in conjunction with FIG. 6/FIG. 7. FIG. 8 is a diagram illustrating a third proposed octahedron projection layout according to an embodiment of the present invention. The third proposed octahedron projection layout 800 can be derived from the reshaped octahedron projection layout 606/706 with the triangular projection face "A" split into a first right-triangle-shaped part 802 and a second right-triangle-shaped part 804 (which are assembled in the third proposed octahedron projection layout 800 with different orientations), the triangular projection face "B" split into a first right-triangle-shaped part 806 and a second right-triangle-shaped part 808 (which are assembled in the third proposed octahedron projection layout 800 with different orientations), the triangular projection face "K" split into a first right-triangle-shaped part 812 and a second right-triangle-shaped part 814 (which are assembled in the third proposed octahedron projection layout 800 with different orientations), and the triangular projection face "F" split into a first right-triangle-shaped part 816 and a second right-triangle-shaped part 818 (which are assembled in the third proposed octahedron projection layout 800 with different orientations respectively).

The first right-triangle-shaped part 802 of the triangular projection face "A" has three sides S111, S112, S13_1, where the side S111 is the side S11 of the triangular projection face "A", and the side S13_1 is a first part of the side S13 of the triangular projection face "A". The second right-triangle-shaped part 804 of the triangular projection face "A" has three sides S121, S122, S13_2, where the side S121 is the side S12 of the triangular projection face "A", and the side S13_2 is a second part of the side S13 of the triangular projection face "A".

The first right-triangle-shaped part 806 of the triangular projection face "B" has three sides S221, S222, S23_1, where the side S221 is the side S22 of the triangular projection face "B", and the side S23_1 is a first part of the side S23 of the triangular projection face "B". The second right-triangle-shaped part 808 of the triangular projection face "B" has three sides S211, S212, S23_2, where the side S211 is the side S21 of the triangular projection face "B", and the side S23_2 is a second part of the side S23 of the triangular projection face "B".

The first right-triangle-shaped part 812 of the triangular projection face "K" has three sides S511, S512, S53_1, where the side S511 is the side SM of the triangular projection face "K", and the side S53_1 is a first part of the side S53 of the triangular projection face "K". The second right-triangle-shaped part 814 of the triangular projection face "K" has three sides S521, S522, S53_2, where the side S521 is the side S52 of the triangular projection face "K", and the side S53_2 is a second part of the side S53 of the triangular projection face "K".

The first right-triangle-shaped part 816 of the triangular projection face "F" has three sides S621, S622, S63_1, where the side S621 is the side S62 of the triangular projection face "F", and the side S63_1 is a first part of the side S63 of the triangular projection face "F". The second right-triangle-shaped part 816 of the triangular projection face "F" has three sides S611, S612, S63_2, where the side S611 is the side S61 of the triangular projection face "F", and the side S63_2 is a second part of the side S63 of the triangular projection face "F".

In accordance with the third proposed octahedron projection layout 800, the side S111 of the first right-triangle-shaped part 802 of the triangular projection face "A" has contact with the side S72 of the triangular projection face "G", the side S121 of the second right-triangle-shaped part 804 of the triangular projection face "A" has contact with the side S31 of the triangular projection face "C", the side S221 of the first right-triangle-shaped part 806 of the triangular projection face "B" has contact with the side S81 of the triangular projection face "H", the side S211 of the second right-triangle-shaped part 808 of the triangular projection face "B" has contact with the side S42 of the triangular projection face "D", the side S511 of the first right-triangle-shaped part 812 of the triangular projection face "K" has contact with the side S32 of the triangular projection face "C", the side S521 of the second right-triangle-shaped part 814 of the triangular projection face "K" has contact with the side S71 of the triangular projection face "G", the side S621 of the first right-triangle-shaped part 816 of the triangular projection face "F" has contact with the side S41 of the triangular projection face "D", and the side S611 of the second right-triangle-shaped part 818 of the triangular projection face "F" has contact with the side S82 of the triangular projection face "H".

An image content continuity boundary exists between the side S111 of the first right-triangle-shaped part 802 of the triangular projection face "A" and the side S72 of the triangular projection face "G". An image content continuity boundary exists between the side S121 of the second right-triangle-shaped part 804 of the triangular projection face "A" and the triangular projection face "C". An image content continuity boundary exists between the side S221 of the first right-triangle-shaped part 806 of the triangular projection face "B" and the side S81 of the triangular projection face "H". An image content continuity boundary exists between the side S211 of the second right-triangle-shaped part 808 of the triangular projection face "B" and the side S42 of the triangular projection face "D". An image content continuity boundary exists between the side S511 of the first right-triangle-shaped part 812 of the triangular projection face "K" and the side S32 of the triangular projection face "C". An image content continuity boundary exists between the side S521 of the second right-triangle-shaped part 814 of the triangular projection face "K" and the side S71 of the triangular projection face "G". An image content continuity boundary exists between the side S621 of the first right-triangle-shaped part 816 of the triangular projection face "F" and the side S41 of the triangular projection face "D". An image content continuity boundary exists between the side S611 of the second right-triangle-shaped part 818 of the triangular projection face "F" and the side S82 of the triangular projection face "H". An image content continuity boundary exists between the side S33 of the triangular projection face "C" and the side S43 of the triangular projection face "D". An image content continuity boundary exists between the side S73 of the triangular projection face "G" and the side S83 of the triangular projection face "H".

In addition to the aforementioned image content discontinuity boundaries, there are an image content discontinuity boundary between the side S53_1 of the first right-triangle-shaped part 812 of the triangular projection face "K" and the side S53_2 of the second right-triangle-shaped part 814 of the triangular projection face "K", and an image content discontinuity boundary between the side S63_1 of the first right-triangle-shaped part 816 of the triangular projection face "F" and the side S63_2 of the second right-triangle-shaped part 818 of the triangular projection face "F".

Figure 9:
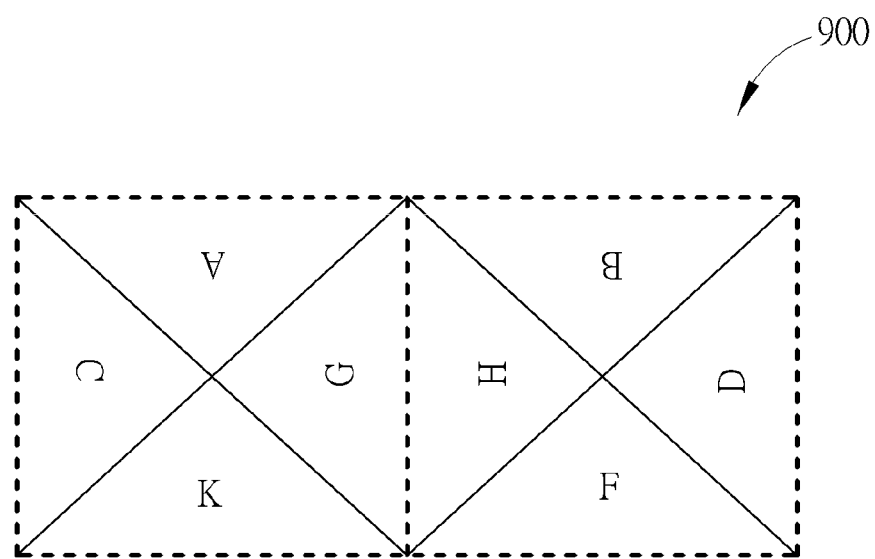
FIG. 9 is a diagram illustrating a fourth proposed octahedron projection layout according to an embodiment of the present invention.

Please refer to FIG. 9 in conjunction with FIG. 6/FIG. 7. FIG. 9 is a diagram illustrating a fourth proposed octahedron projection layout according to an embodiment of the present invention. The fourth proposed octahedron projection layout 900 can be derived from the reshaped octahedron projection layout 606/706 with rearrangement of the triangular projection faces "A"-"H". In accordance with the fourth proposed octahedron projection layout 900, the side S12 of the triangular projection face "A" has contact with the side S31 of the triangular projection face "C", the side S11 of the triangular projection face "A" has contact with the side S72 of the triangular projection face "G", the side S51 of the triangular projection face "K" has contact with the side S32 of the triangular projection face "C", the side S52 of the triangular projection face "K" has contact with the side S71 of the triangular projection face "G", the side S73 of the triangular projection face "G" has contact with the side S83 of the triangular projection face "H", the side S22 of the triangular projection face "B" has contact with the side S81 of the triangular projection face "H", the side S21 of the triangular projection face "B" has contact with the side S42 of the triangular projection face "D", the side S61 of the triangular projection face "F" has contact with the side S82 of the triangular projection face "H", and the side S62 of the triangular projection face "F" has contact with the side S41 of the triangular projection face "D".

It should be noted that there is no image content discontinuity boundary between sides of adjacent triangular projection faces. Specifically, the equator 208 of the viewing sphere 202 is mapped along sides S13, S23, S33, S43, S53, S63, S73 and S83 of the triangular projection faces "A"-"H", where the triangular projection faces "A", "C", "K", "G" are all derived from the top hemisphere (e.g., northern hemisphere) of the viewing sphere 202, and the triangular projection faces "B", "D", "F", "H" are all derived from the bottom hemisphere (e.g., southern hemisphere) of the viewing sphere 202. Hence, the fourth proposed octahedron projection layout 900 may be divided into two square parts which represent a top view and a bottom view of the viewing sphere 202, respectively. In some embodiments, these two square parts may be encoded/decoded separately by using tile-based segmentation, slice-based segmentation, or other segmentation method. In aforementioned octahedron projection layouts 300, 400, 800, 900, the equator 208 of the viewing sphere 202 is mapped along sides of the triangular projection faces "1"-"8"/"A"-"H" via an octahedron projection that is based on the unrotated octahedron 204. In general, moving objects are mostly located at the equator 208 of the viewing sphere 202. The coding efficiency can be improved if the equator 208 of the viewing sphere 202 is mapped along middles of the triangular projection faces or any positions other than sides of the triangular projection faces.

Figure 10:
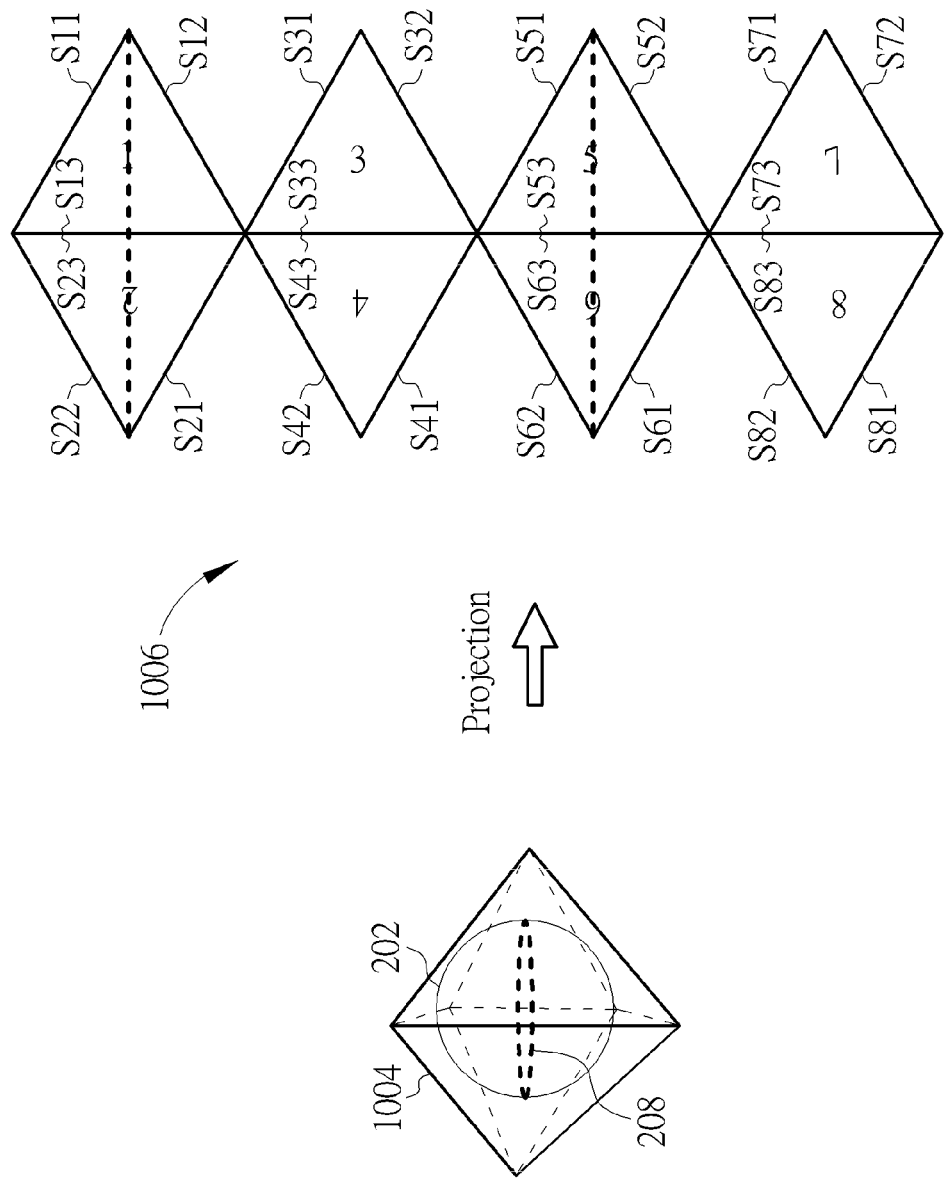
FIG. 10 is a diagram illustrating triangular projection faces of an original octahedron projection layout that are obtained from an octahedron projection of a viewing sphere according to a rotated octahedron.

FIG. 10 is a diagram illustrating triangular projection faces of an original octahedron projection layout that are obtained from an octahedron projection of a viewing sphere according to a rotated octahedron. A 360-degree image content of the viewing sphere 202 is mapped onto triangular projection faces (labeled by reference numbers "1", "2", "3", "4", "5", "6", "7" and "8") of a rotated octahedron 1004. The rotated octahedron 1004 shown in FIG. 10 may be obtained by applying 90-degree rotation to the octahedron 204 shown in FIG. 2. As shown in FIG. 10, the triangular projection faces "1"-"8" are assembled in an original octahedron projection layout 1006. A shape of each of the triangular projection faces "1"-"8" is an equilateral triangle. The triangular projection face "1" has three sides S11, S12, S13. The triangular projection face "2" has three sides S21, S22, S23. The triangular projection face "3" has three sides S31, S32, S33. The triangular projection face "4" has three sides S41, S42, S43. The triangular projection face "5" has three sides S51, S52, S53. The triangular projection face "6" has three sides S61, S62, S63. The triangular projection face "7" has three sides S71, S72, S73. The triangular projection face "8" has three sides S81, S82, S83. The viewing sphere 202 is composed of a left hemisphere and a right hemisphere. The triangular projection faces "1", "3", "5", "7" are all derived from the right hemisphere, and the triangular projection faces "2", "4", "6", "8" are all derived from the left hemisphere. Due to octahedron projection that is based on the rotated octahedron 1004, the equator 208 of the viewing sphere 202 is not mapped along any side of each triangular projection face. In this embodiment, the equator 208 of the viewing sphere 202 is mapped along middles of the triangular projection faces "1", "2", "5", "6", as indicated by broken lines in FIG. 10.

Figure 11:
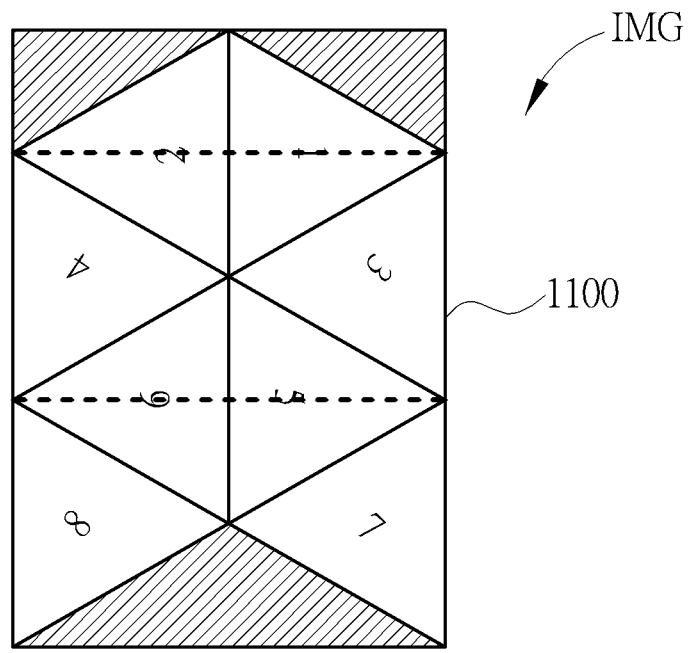
FIG. 11 is a diagram illustrating a fifth proposed octahedron projection layout according to an embodiment of the present invention.

Please refer to FIG. 11 in conjunction with FIG. 10. FIG. 11 is a diagram illustrating a fifth proposed octahedron projection layout according to an embodiment of the present invention. The fifth proposed octahedron projection layout 1100 can be derived from the original octahedron projection layout 1006 with the triangular projection face "3" rotated by 60° clockwise, the triangular projection face "4" rotated by 60° counterclockwise, the triangular projection face "7" rotated by 60° counterclockwise, and the triangular projection face "8" rotated by 60° clockwise. The arrangement of triangular projection faces in the fifth proposed octahedron projection layout 1100 is similar to that of the triangular projection faces in the first proposed octahedron projection layout 300. Since a person skilled in the art can readily understand details of the fifth proposed octahedron projection layout 1100 after reading above paragraphs directed to the first proposed octahedron projection layout 300, further description is omitted here for brevity.

When the octahedron projection layout L_OHP is set by the fifth proposed octahedron projection layout 1100 shown in FIG. 11, dummy areas (e.g., black areas or white areas) are needed to make the projection-based image IMG have a rectangular shape. If a shape of the octahedron projection layout L_OHP is a rectangle, the dummy areas (e.g., black areas or white areas) can be omitted, thus allowing the projection-based image IMG to have a more compact size.

Figure 12:
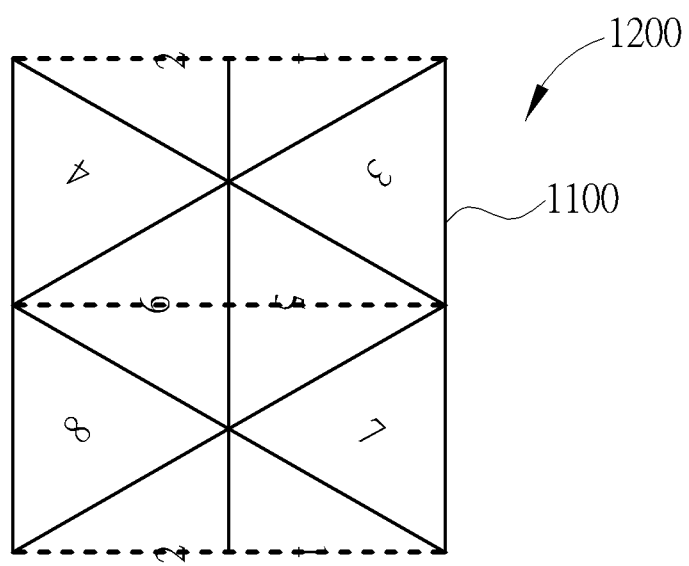
FIG. 12 is a diagram illustrating a sixth proposed octahedron projection layout according to an embodiment of the present invention.

Please refer to FIG. 12 in conjunction with FIG. 10. FIG. 12 is a diagram illustrating a sixth proposed octahedron projection layout according to an embodiment of the present invention. The sixth proposed octahedron projection layout 1200 can be derived from the fifth proposed octahedron projection layout 1100 with the triangular projection face "1" split into two right-triangle-shaped parts and the triangular projection face "2" split into two right-triangle-shaped parts. One right-triangle-shaped part of the triangular projection face "1" and one right-triangle-shaped part of the triangular projection face "2" are relocated to be adjacent to the triangular projection faces "7" and "8", respectively. The arrangement of triangular projection faces in the sixth proposed octahedron projection layout 1200 is similar to that of the triangular projection faces in the second proposed octahedron projection layout 400. Since a person skilled in the art can readily understand details of the sixth proposed octahedron projection layout 1200 after reading above paragraphs directed to the second proposed octahedron projection layout 400, further description is omitted here for brevity.

As can be seen from FIG. 12, a shape of the sixth proposed octahedron projection layout 1200 is a rectangle. Hence, when the octahedron projection layout L_OHP is set by the sixth proposed octahedron projection layout 1200, a size of the projection-based frame IMG is same as the size of the sixth proposed octahedron projection layout 1200. In this way, the projection-based image IMG can have a compact size due to omission of dummy areas (e.g., black areas or white areas).

In any of the fifth proposed octahedron projection layout 1100 and the sixth proposed octahedron projection layout 1200, a shape of each of the triangular projection faces "1"-"8" is an equilateral triangle. Hence, it is impossible to assemble the triangular projection faces "1"-"8" without introducing image content discontinuity boundaries. If a shape of each of the triangular projection faces can be an isosceles right triangle, the number of image content discontinuity boundaries resulting from assembling of the triangular projection faces in an octahedron projection layout can be further reduced. As illustrated in FIG. 5, one triangular projection face with a shape of an equilateral triangle may be reshaped to have a shape of an isosceles right triangle.

Figure 13:
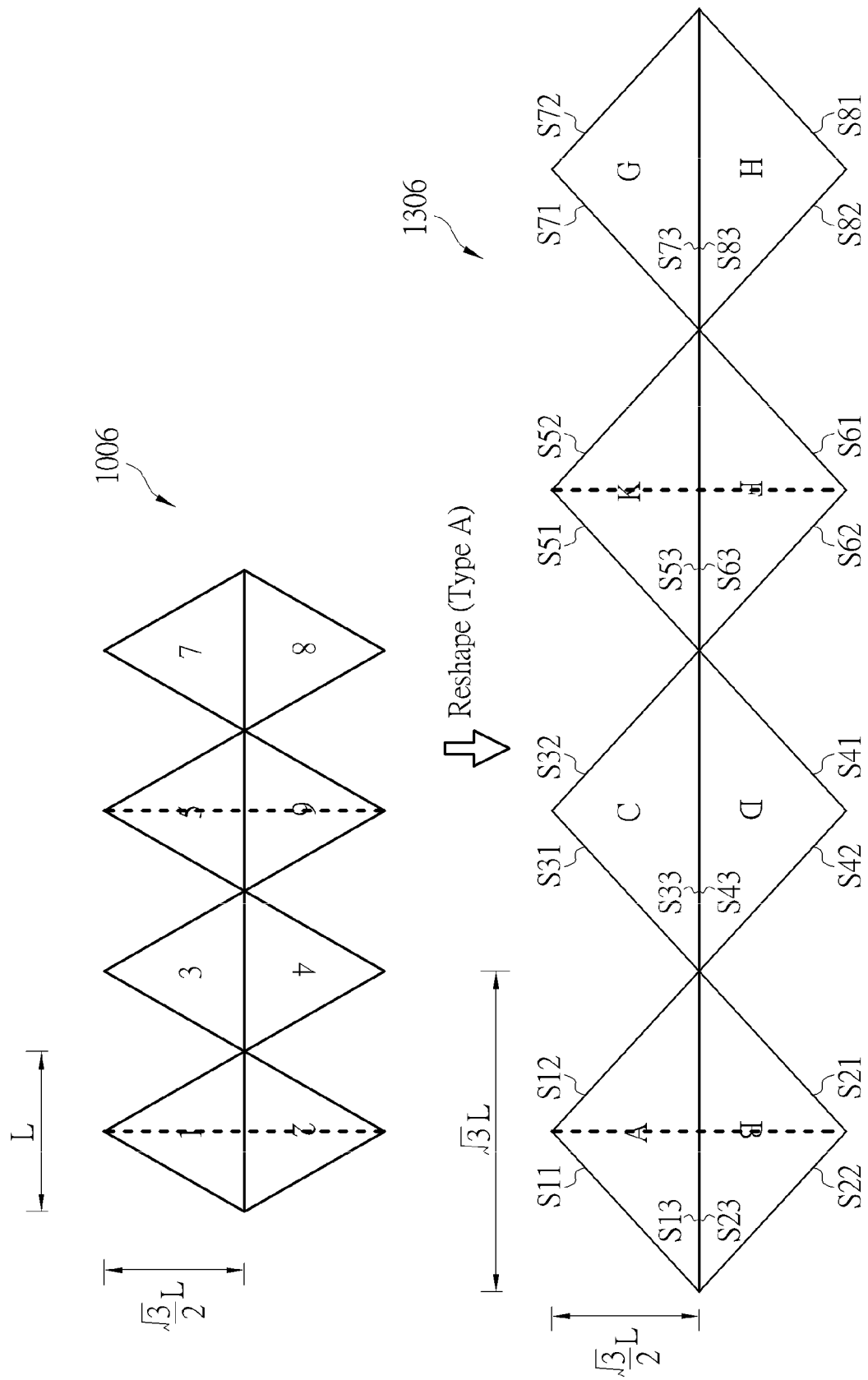
FIG. 13 is diagram illustrating a third reshaped octahedron projection layout according to an embodiment of the present invention.

FIG. 13 is diagram illustrating a third reshaped octahedron projection layout according to an embodiment of the present invention. After each triangular projection face of the original octahedron projection layout 1006 is reshaped to be a Type-A reshaped triangle, a reshaped octahedron projection layout 1306 composed of triangular projection faces (labeled by reference characters "A", "B", "C", "D", "F", "G", "K" and "H") is obtained, where a shape of each of the triangular projection faces "A"-"H" is an isosceles right triangle. The triangular projection face "A" has three sides S11, S12, S13. The triangular projection face "B" has three sides S21, S22, S23. The triangular projection face "C" has three sides S31, S32, S33. The triangular projection face "D" has three sides S41, S42, S43. The triangular projection face "K" has three sides S51, S52, S53. The triangular projection face "F" has three sides S61, S62, S63. The triangular projection face "G" has three sides S71, S72, S73. The triangular projection face "H" has three sides S81, S82, S83. It should be noted that the triangular projection faces "A", "C", "K", "G" are all derived from the right hemisphere of the viewing sphere 202, and the triangular projection faces "B", "D", "F", "H" are all derived from the left hemisphere of the viewing sphere 202. The equator 208 of the viewing sphere 202 is not mapped along any of sides S11-S12, S21-S23, S31-S33, S41-S43, S51-S52, S61-S63, S71-S73, S81-S83. In this embodiment, the equator 208 of the viewing sphere 202 is mapped along middles of the triangular projection faces "A", "B", "K", "F", as indicated by broken lines in FIG. 13.

Figure 14:
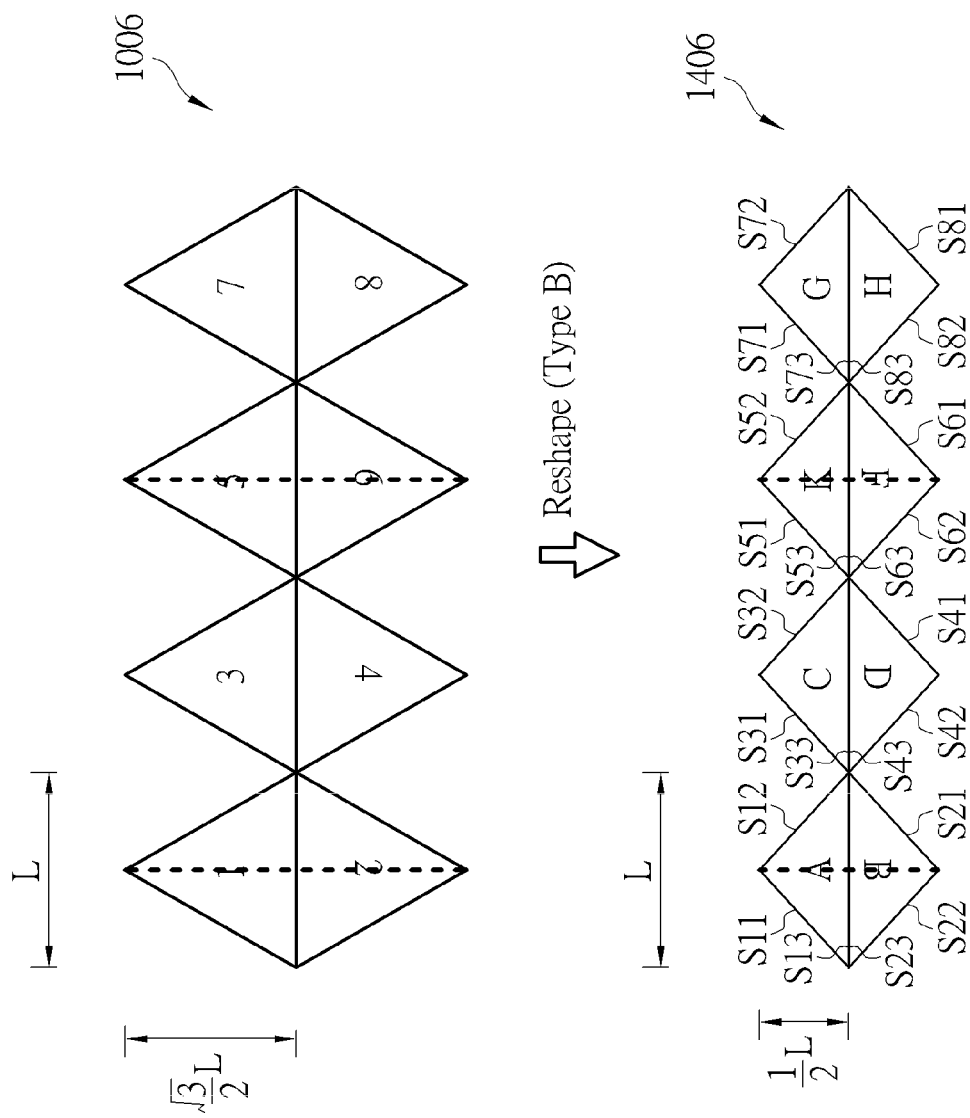
FIG. 14 is diagram illustrating a fourth reshaped octahedron projection layout according to an embodiment of the present invention.

FIG. 14 is diagram illustrating a fourth reshaped octahedron projection layout according to an embodiment of the present invention. After each triangular projection face of the original octahedron projection layout 1006 is reshaped to be a Type-B reshaped triangle, a reshaped octahedron projection layout 1406 composed of triangular projection faces (labeled by reference characters "A", "B", "C", "D", "F", "G", "K" and "H") is obtained, where a shape of each of the triangular projection faces "A"-"H" is an isosceles right triangle. The triangular projection face "A" has three sides S11, S12, S13. The triangular projection face "B" has three sides S21, S22, S23. The triangular projection face "C" has three sides S31, S32, S33. The triangular projection face "D" has three sides S41, S42, S43. The triangular projection face "K" has three sides S51, S52, S53. The triangular projection face "F" has three sides S61, S62, S63. The triangular projection face "G" has three sides S71, S72, S73. The triangular projection face "H" has three sides S81, S82, S83. It should be noted that the triangular projection faces "A", "C", "K", "G" are all derived from the right hemisphere of the viewing sphere 202, and the triangular projection faces "B", "D", "F", "H" are all derived from the left hemisphere of the viewing sphere 202. The equator 208 of the viewing sphere 202 is not mapped along any of sides S11-S12, S21-S23, S31-S33, S41-S43, S51-S52, S61-S63, S71-S73, S81-S83. In this embodiment, the equator 208 of the viewing sphere 202 is mapped along middles of the triangular projection faces "A", "B", "K", "F", as indicated by broken lines in FIG. 14.

The triangular projection faces "A"-"H" of the reshaped octahedron projection layout 1306/1406 can be properly rearranged to produce a compact octahedron projection layout.

Figure 15:
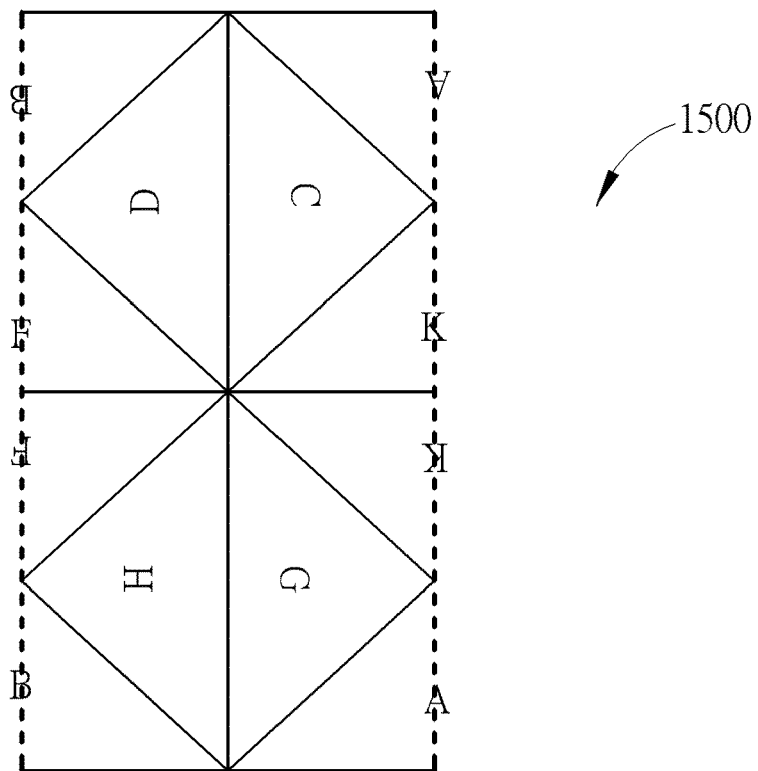
FIG. 15 is a diagram illustrating a seventh proposed octahedron projection layout according to an embodiment of the present invention.

Please refer to FIG. 15 in conjunction with FIG. 13/FIG. 14. FIG. 15 is a diagram illustrating a seventh proposed octahedron projection layout according to an embodiment of the present invention. The seventh proposed octahedron projection layout 1500 can be derived from the reshaped octahedron projection layout 1306/1406 with the triangular projection face "A" split into two right-triangle-shaped parts (which are assembled in the seventh proposed octahedron projection layout 1500 with different orientations), the triangular projection face "B" split into two right-triangle-shaped parts (which are assembled in the seventh proposed octahedron projection layout 1500 with different orientations), the triangular projection face "K" split into two right-triangle-shaped parts (which are assembled in the seventh proposed octahedron projection layout 1500 with different orientations), and the triangular projection face "F" split into two right-triangle-shaped parts (which are assembled in the seventh proposed octahedron projection layout 1500 with different orientations).

The arrangement of triangular projection faces in the seventh proposed octahedron projection layout 1500 is similar to that of the triangular projection faces in the third proposed octahedron projection layout 800. Since a person skilled in the art can readily understand details of the seventh proposed octahedron projection layout 1500 after reading above paragraphs directed to the third proposed octahedron projection layout 800, further description is omitted here for brevity.

Figure 16:
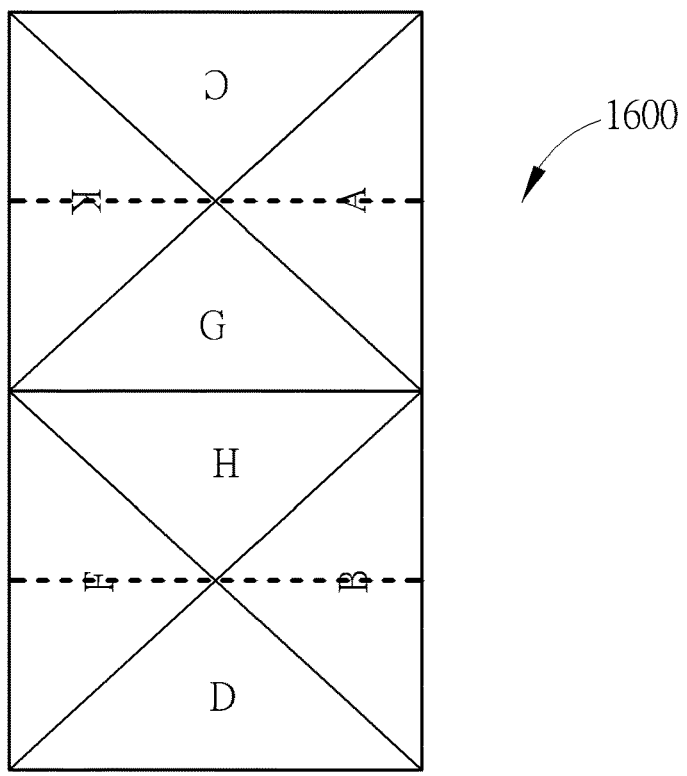
FIG. 16 is a diagram illustrating an eighth proposed octahedron projection layout according to an embodiment of the present invention.

Please refer to FIG. 16 in conjunction with FIG. 13/FIG. 14. FIG. 16 is a diagram illustrating an eighth proposed octahedron projection layout according to an embodiment of the present invention. The eighth proposed octahedron projection layout 1600 can be derived from the reshaped octahedron projection layout 1306/1406 with rearrangement of the triangular projection faces "A"-"H". It should be noted that there is no image content discontinuity boundary between sides of adjacent triangular projection faces. The arrangement of triangular projection faces in the eighth proposed octahedron projection layout 1600 is similar to that of the triangular projection faces in the fourth proposed octahedron projection layout 900. Since a person skilled in the art can readily understand details of the eighth proposed octahedron projection layout 1600 after reading above paragraphs directed to the fourth proposed octahedron projection layout 900, further description is omitted here for brevity.

A projection-based frame with a 360-degree image content represented by triangular projection faces assembled in any proposed octahedron projection layout may be converted into a projection-based frame with a 360-degree image content represented by projection faces of a different 360 VR projection layout (e.g., an equirectangular projection layout), and vice versa. For example, the conversion between an octahedron projection layout and an equirectangular projection layout can be achieved by using a proper mapping function.

Figure 17:
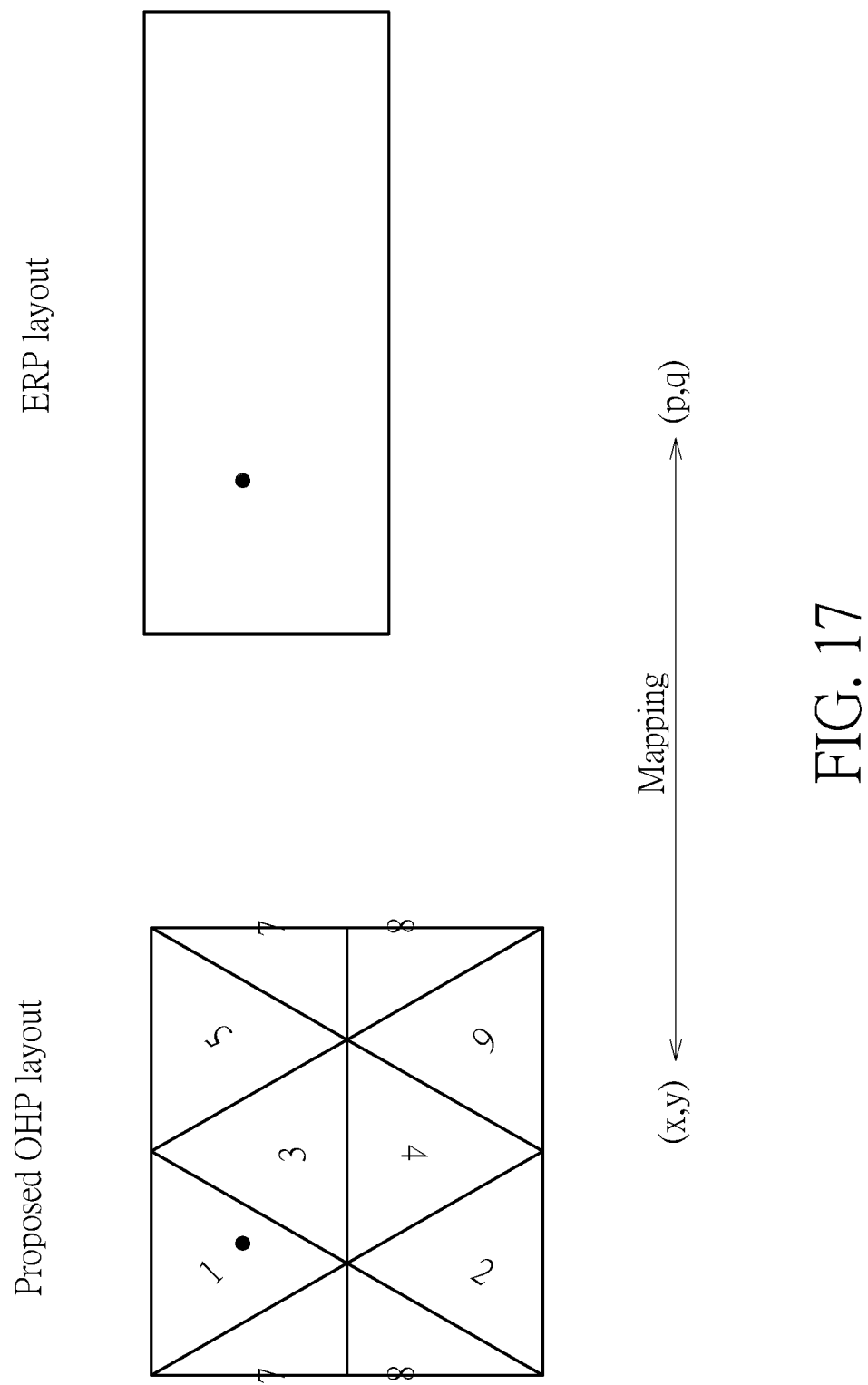
FIG. 17 is a diagram illustrating single-phase mapping between a proposed octahedron projection layout and an equirectangular projection layout according to an embodiment of the present invention.

FIG. 17 is a diagram illustrating single-phase mapping between a proposed octahedron projection (OHP) layout and an equirectangular projection (ERP) layout according to an embodiment of the present invention. In a case where an equirectangular projection layout is required to be converted into to a proposed octahedron projection layout (e.g., the second proposed octahedron projection layout 400 shown in FIG. 4), the equirectangular projection layout has a corresponding point (p, q) mapped to each integer pixel (x, y) in the proposed octahedron projection layout according to a mapping function, where p and q may be represented by non-integer values or may be truncated into integer values. Given the corresponding point (p, q) in the equirectangular projection layout, an interpolation filter may be applied to integer pixels around the point (p, q) to derive the value of the integer pixel (x, y) in the octahedron projection layout.

In another case where a proposed octahedron projection layout (e.g., the second proposed octahedron projection layout 400 shown in FIG. 4) is required to be converted into an equirectangular projection layout, the proposed octahedron projection layout has a corresponding point (x, y) mapped to each integer pixel (p, q) in the equirectangular projection layout according to a mapping function, where x and y may be represented by non-integer values or may be truncated into integer values. Given the corresponding point (x, y) in the proposed octahedron projection layout, an interpolation filter may be applied to integer pixels around the point (x, y) to derive the value of the integer pixel (p, q) in the equirectangular projection layout.

By way of example, but not limitation, the interpolation filter (e.g., interpolation filter 128 used in post-processing circuit 122) may be a bilinear filter, a bicubic filter, a lanczos filter, a 2-D bicubic filter, or a 2-D lanczos filter. Further, on the discontinuity boundaries, an average or smoothing filter may be further employed to filter the boundary pixels. For example, a weighted average of pixels derived from two or more projection faces is used to represent a pixel on the discontinuity boundary.

As shown in FIG. 17, mapping between a proposed octahedron projection layout and an equirectangular projection layout is achieved by single-phase conversion. Alternatively, mapping between a proposed octahedron projection layout and an equirectangular projection layout may be achieved by multi-phase conversion.

Figure 18:
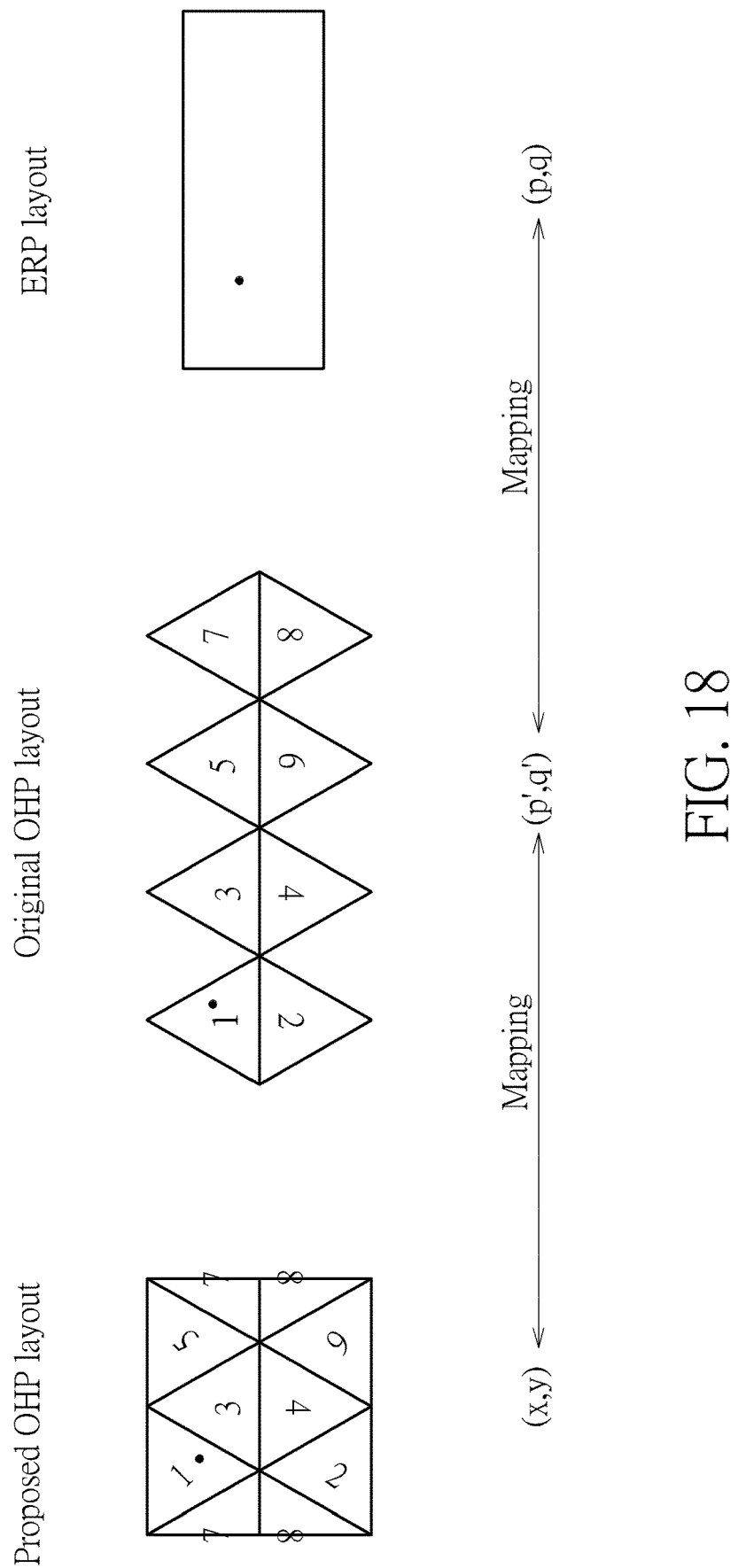
FIG. 18 is a diagram illustrating multi-phase mapping between a proposed octahedron projection layout and an equirectangular projection layout according to an embodiment of the present invention.

FIG. 18 is a diagram illustrating multi-phase mapping between a proposed octahedron projection layout and an equirectangular projection layout according to an embodiment of the present invention. In a case where an equirectangular projection layout is required to be converted into a proposed octahedron projection layout (e.g., the second proposed octahedron projection layout 400 shown in FIG. 4), the equirectangular projection layout has a corresponding point (p, q) mapped to each integer pixel (x, y) in the proposed octahedron projection layout via a reference pixel (p', q') found in an original octahedron projection layout (e.g., the original octahedron projection layout 206 shown in FIG. 2). For example, the reference pixel (p', q') mapped to the integer pixel (x, y) may be found using one mapping function, and the point (p, q) mapped to the reference pixel (p', q') may be found using another mapping function. To derive the reference pixel (p', q') in the original octahedron projection layout, the location (x, y) may be rotated according to the corresponding angle. The rotation can be performed independently for each triangle, and the centre of the rotation can be defined as a corner, a center of gravity, or a centroid of a triangle. Similarly, given the corresponding point (p, q) in the equirectangular projection layout, an interpolation filter may be applied to integer pixels around the point (p, q) for deriving the value of the integer pixel (x, y) in the proposed octahedron projection layout.

In another case where a proposed octahedron projection layout (e.g., the second proposed octahedron projection layout 400 shown in FIG. 4) is required to be converted into an equirectangular projection layout, the proposed octahedron projection layout has a corresponding point (x, y) mapped to each integer pixel (p, q) in the equirectangular projection layout via a reference point (p', q') found in an original octahedron projection layout (e.g., the original octahedron projection layout 206 shown in FIG. 2). For example, the reference pixel (p', q') mapped to the integer pixel (p, q) may be found using one mapping function, and the point (x, y) mapped to the reference pixel (p', q') may be found using another mapping function. To derive the point (x, y) in the proposed octahedron projection layout, the location (p', q') may be rotated according to the corresponding angle. The rotation can be performed independently for each triangle, and a centre of the rotation can be defined as a corner, a center of gravity, or a centroid of a triangle.

Similarly, given the corresponding point (x, y) in the proposed octahedron projection layout, an interpolation filter may be applied to integer pixels around the point (x, y) for deriving the value of the integer pixel (p, q) in the equirectangular projection layout.

The octahedron projection layout L_OHP employed by the conversion circuit 118 may be any of the proposed octahedron projection layouts 300, 400, 800, 900, 1100, 1200, 1500, 1600. Hence, the projection-based frame IMG to be encoded by the encoding circuit 114 has a proposed octahedron projection layout. After the bitstream BS is decoded by the decoding circuit 120, the decoded frame (i.e., reconstructed frame) IMG' has the same proposed octahedron projection layout. In some embodiments of the present invention, the post-processing circuit 122 may process the decoded frame IMG' to transform the decoded frame IMG' with the proposed octahedron projection layout into a post-processed frame IMG" with a different 360 VR projection layout (e.g., an equirectangular projection layout) for further processing. For example, the interpolation filter 128 may be a multi-tap filter used to determine the value of the integer pixel (p, q) by an interpolated pixel value obtained from integer pixels around the corresponding point (x, y) in the proposed octahedron projection layout, where the point (x, y) is mapped to the integer pixel (p, q). If the octahedron projection layout L_OHP employed by the conversion circuit 118 is one of the proposed octahedron projection layouts 300, 400, 800, 1100, 1200, 1500, the decoded frame IMG' has picture boundaries (which are caused by filling of dummy areas) and/or image content discontinuity boundaries (which are caused by assembling of triangular projection faces). If integer pixels across a picture boundary/image content discontinuity boundary are processed by the interpolation filter 128 to calculate an interpolated value that will be used as the value of the integer pixel (p, q) in the equirectangular projection layout, the image quality of the integer pixel (p, q) will be degraded. To address this issue, the present invention further proposes applying pixel padding to the picture boundaries (which are caused by filling of dummy areas) and/or image content discontinuity boundaries (which are caused by assembling of triangular projection faces).

Figure 19:
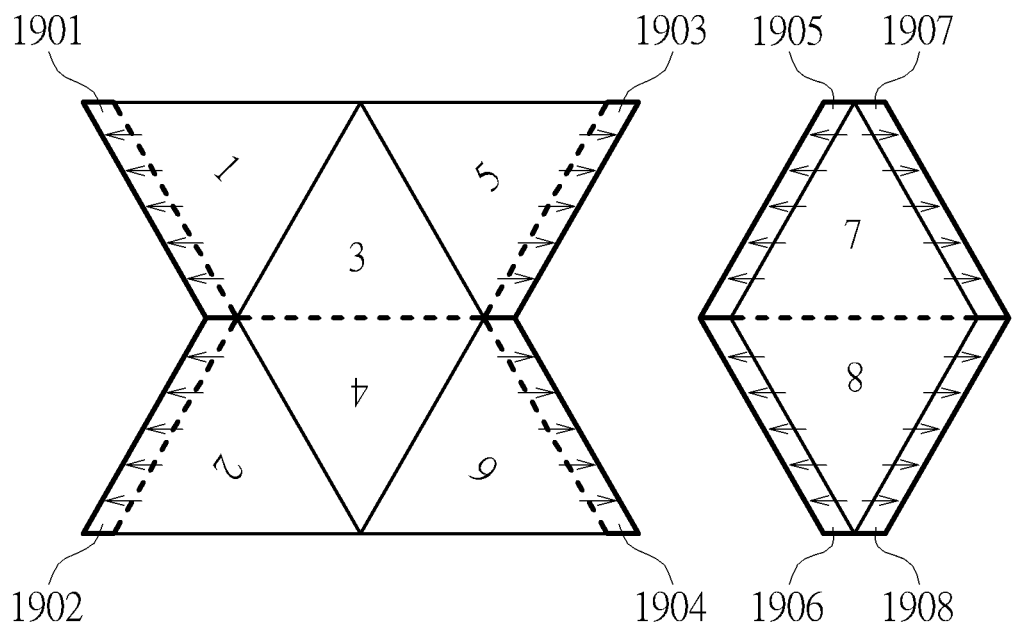
FIG. 19 is a diagram illustrating a first pixel padding design according to an embodiment of the present invention.

FIG. 19 is a diagram illustrating a first pixel padding design according to an embodiment of the present invention. In this embodiment, the octahedron projection layout L_OHP employed by the conversion circuit 118 is set by the first proposed octahedron projection layout 300 shown in FIG. 3. Hence, padding areas 1901, 1902, 1907, 1908 are added for picture boundaries, and padding areas 1903, 1904, 1905, 1906 are added for image content discontinuity boundaries. The width of each padding area may depend on the length (tap number) of the interpolation filter 128.

The padding area 1901 is extended from the side S13 of the triangular projection face "1" in the horizontal direction, and is composed of padding pixels derived from (e.g., duplicated from) boundary pixels of the side S13 of the triangular projection face "1" as indicated by the arrow symbols. The padding area 1902 is extended from the side S23 of the triangular projection face "2" in the horizontal direction, and is composed of padding pixels derived from (e.g., duplicated from) boundary pixels of the side S23 of the triangular projection face "2" as indicated by the arrow symbols. The padding area 1903 is extended from the side S53 of the triangular projection face "5" in the horizontal direction, and is composed of padding pixels derived from (e.g., duplicated from) boundary pixels of the side S53 of the triangular projection face "5" as indicated by the arrow symbols. The padding area 1904 is extended from the side S63 of the triangular projection face "6" in the horizontal direction, and is composed of padding pixels derived from (e.g., duplicated from) boundary pixels of the side S63 of the triangular projection face "6" as indicated by the arrow symbols.

The padding area 1905 is extended from the side S71 of the triangular projection face "7" in the horizontal direction, and is composed of padding pixels derived from (e.g., duplicated from) boundary pixels of the side S71 of the triangular projection face "7" as indicated by the arrow symbols. The padding area 1906 is extended from the side S82 of the triangular projection face "8" in the horizontal direction, and is composed of padding pixels derived from (e.g., duplicated from) boundary pixels of the side S82 of the triangular projection face "8" as indicated by the arrow symbols. The padding area 1907 is extended from the side S72 of the triangular projection face "7" in the horizontal direction, and is composed of padding pixels derived from (e.g., duplicated from) boundary pixels of the side S72 of the triangular projection face "7" as indicated by the arrow symbols. The padding area 1908 is extended from the side S81 of the triangular projection face "8" in the horizontal direction, and is composed of padding pixels derived from (e.g., duplicated from) boundary pixels of the side S81 of the triangular projection face "8" as indicated by the arrow symbols.

Figure 20:
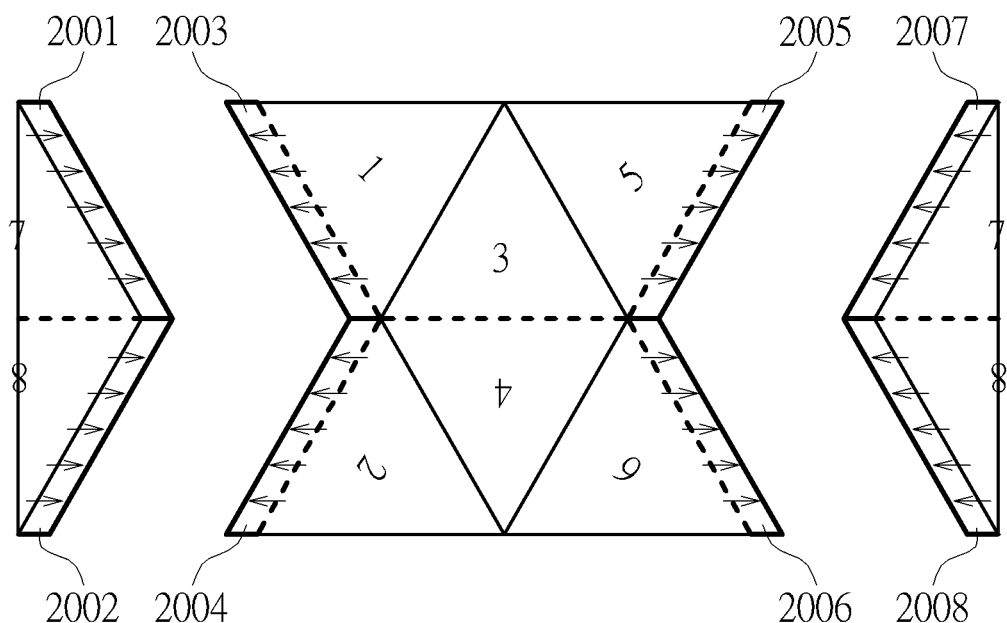
FIG. 20 is a diagram illustrating a second pixel padding design according to an embodiment of the present invention.

FIG. 20 is a diagram illustrating a second pixel padding design according to an embodiment of the present invention. In this embodiment, the octahedron projection layout L_OHP employed by the conversion circuit 118 is set by the fourth proposed octahedron projection layout 400 shown in FIG. 4. Hence, padding areas 2001, 2002, 2003, 2004, 2005, 2006, 2007, 2008 are added for image content discontinuity boundaries. The width of each padding area may depend on the length (tap number) of the interpolation filter 128.

The padding area 2001 is extended from the side S72 of the triangular projection face "7" in the horizontal direction, and is composed of padding pixels derived from (e.g., duplicated from) boundary pixels of the side S72 of the triangular projection face "7" as indicated by the arrow symbols. The padding area 2002 is extended from the side S81 of the triangular projection face "8" in the horizontal direction, and is composed of padding pixels derived from (e.g., duplicated from) boundary pixels of the side S81 of the triangular projection face "8" as indicated by the arrow symbols. The padding area 2003 is extended from the side S13 of the triangular projection face "1" in the horizontal direction, and is composed of padding pixels derived from (e.g., duplicated from) boundary pixels of the side S13 of the triangular projection face "1" as indicated by the arrow symbols. The padding area 2004 is extended from the side S23 of the triangular projection face "2" in the horizontal direction, and is composed of padding pixels derived from (e.g., duplicated from) boundary pixels of the side S23 of the triangular projection face "2" as indicated by the arrow symbols.

The padding area 2005 is extended from the side S53 of the triangular projection face "5" in the horizontal direction, and is composed of padding pixels derived from (e.g., duplicated from) boundary pixels of the side S53 of the triangular projection face "5" as indicated by the arrow symbols. The padding area 2006 is extended from the side S63 of the triangular projection face "6" in the horizontal direction, and is composed of padding pixels derived from (e.g., duplicated from) boundary pixels of the side S63 of the triangular projection face "6" as indicated by the arrow symbols. The padding area 2007 is extended from the side S71 of the triangular projection face "7" in the horizontal direction, and is composed of padding pixels derived from (e.g., duplicated from) boundary pixels of the side S71 of the triangular projection face "7" as indicated by the arrow symbols. The padding area 2008 is extended from the side S82 of the triangular projection face "8" in the horizontal direction, and is composed of padding pixels derived from (e.g., duplicated from) boundary pixels of the side S82 of the triangular projection face "8" as indicated by the arrow symbols.

Figure 21:
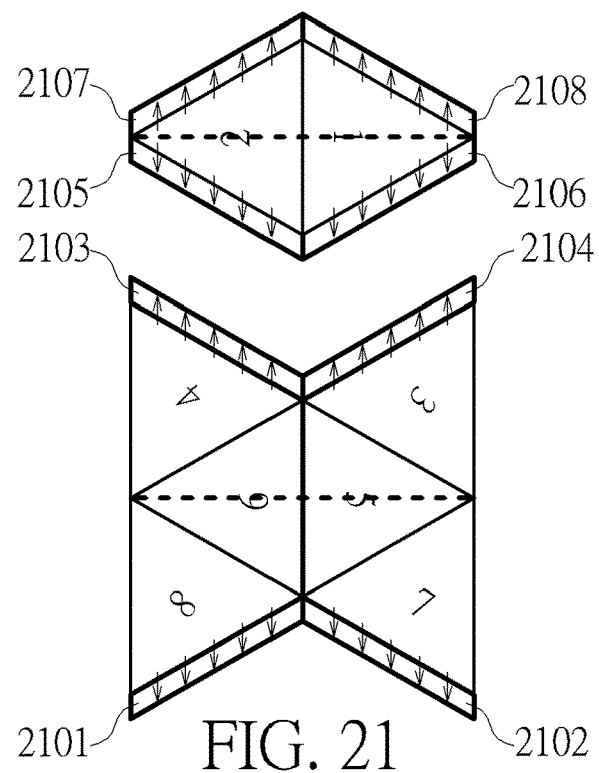
FIG. 21 is a diagram illustrating a third pixel padding design according to an embodiment of the present invention.

FIG. 21 is a diagram illustrating a third pixel padding design according to an embodiment of the present invention. In this embodiment, the octahedron projection layout L_OHP employed by the conversion circuit 118 is set by the fifth proposed octahedron projection layout 1100 shown in FIG. 11. Hence, padding areas 2101, 2102, 2107, 2108 are added for picture boundaries, and padding areas 2103, 2104, 2105, 2106 are added for image content discontinuity boundaries. The width of each padding area may depend on the length (tap number) of the interpolation filter 128.

The padding area 2101 is extended from the side S83 of the triangular projection face "8" in the vertical direction, and is composed of padding pixels derived from (e.g., duplicated from) boundary pixels of the side S83 of the triangular projection face "8" as indicated by the arrow symbols. The padding area 2102 is extended from the side S73 of the triangular projection face "7" in the vertical direction, and is composed of padding pixels derived from (e.g., duplicated from) boundary pixels of the side S73 of the triangular projection face "7" as indicated by the arrow symbols. The padding area 2103 is extended from the side S43 of the triangular projection face "4" in the vertical direction, and is composed of padding pixels derived from (e.g., duplicated from) boundary pixels of the side S43 of the triangular projection face "4" as indicated by the arrow symbols. The padding area 2104 is extended from the side S33 of the triangular projection face "3" in the vertical direction, and is composed of padding pixels derived from (e.g., duplicated from) boundary pixels of the side S33 of the triangular projection face "3" as indicated by the arrow symbols.

The padding area 2105 is extended from the side S21 of the triangular projection face "2" in the vertical direction, and is composed of padding pixels derived from (e.g., duplicated from) boundary pixels of the side S21 of the triangular projection face "2" as indicated by the arrow symbols. The padding area 2106 is extended from the side S12 of the triangular projection face "1" in the vertical direction, and is composed of padding pixels derived from (e.g., duplicated from) boundary pixels of the side S12 of the triangular projection face "1" as indicated by the arrow symbols. The padding area 2107 is extended from the side S22 of the triangular projection face "2" in the vertical direction, and is composed of padding pixels derived from (e.g., duplicated from) boundary pixels of the side S22 of the triangular projection face "2" as indicated by the arrow symbols. The padding area 2108 is extended from the side S11 of the triangular projection face "1" in the vertical direction, and is composed of padding pixels derived from (e.g., duplicated from) boundary pixels of the side S11 of the triangular projection face "1" as indicated by the arrow symbols.

Figure 22:
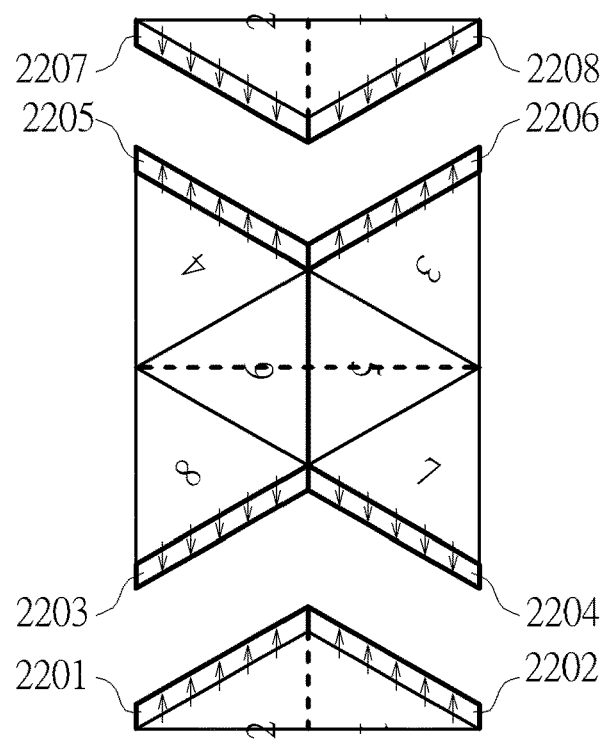
FIG. 22 is a diagram illustrating a fourth pixel padding design according to an embodiment of the present invention.

FIG. 22 is a diagram illustrating a fourth pixel padding design according to an embodiment of the present invention. In this embodiment, the octahedron projection layout L_OHP employed by the conversion circuit 118 is set by the sixth proposed octahedron projection layout 1200 shown in FIG. 12. Hence, padding areas 2201, 2202, 2203, 2204, 2205, 2206, 2207, 2208 are added for image content discontinuity boundaries. The width of each padding area may depend on the length (tap number) of the interpolation filter 128.

The padding area 2201 is extended from the side S22 of the triangular projection face "2" in the vertical direction, and is composed of padding pixels derived from (e.g., duplicated from) boundary pixels of the side S22 of the triangular projection face "2" as indicated by the arrow symbols. The padding area 2202 is extended from the side S11 of the triangular projection face "1" in the vertical direction, and is composed of padding pixels derived from (e.g., duplicated from) boundary pixels of the side S11 of the triangular projection face "1" as indicated by the arrow symbols. The padding area 2203 is extended from the side S83 of the triangular projection face "8" in the vertical direction, and is composed of padding pixels derived from (e.g., duplicated from) boundary pixels of the side S83 of the triangular projection face "8" as indicated by the arrow symbols. The padding area 2204 is extended from the side S73 of the triangular projection face "7" in the vertical direction, and is composed of padding pixels derived from (e.g., duplicated from) boundary pixels of the side S73 of the triangular projection face "7" as indicated by the arrow symbols.

The padding area 2205 is extended from the side S43 of the triangular projection face "4" in the vertical direction, and is composed of padding pixels derived from (e.g., duplicated from) boundary pixels of the side S43 of the triangular projection face "4" as indicated by the arrow symbols. The padding area 2206 is extended from the side S33 of the triangular projection face "3" in the vertical direction, and is composed of padding pixels derived from (e.g., duplicated from) boundary pixels of the side S33 of the triangular projection face "3" as indicated by the arrow symbols. The padding area 2207 is extended from the side S21 of the triangular projection face "2" in the vertical direction, and is composed of padding pixels derived from (e.g., duplicated from) boundary pixels of the side S21 of the triangular projection face "2" as indicated by the arrow symbols. The padding area 2208 is extended from the side S12 of the triangular projection face "1" in the vertical direction, and is composed of padding pixels derived from (e.g., duplicated from) boundary pixels of the side S12 of the triangular projection face "1" as indicated by the arrow symbols.

In one exemplary implementation, the pixel padding operation may be performed by the pre-processing circuit 112 (particularly, the conversion circuit 118) at the encoder side. Hence, the projection-based frame IMG to be encoded has the aforementioned padding areas included therein. In this way, the decoded frame IMG' generated from the decoding circuit 120 also has the padding areas included therein. The post-processing circuit 122 does not need to perform the pixel padding operation upon the decoded frame IMG'.

In another exemplary implementation, the pre-processing circuit 112 (particularly, the conversion circuit 118) does not need to perform the pixel padding operation at the encoder side. Hence, the projection-based frame IMG to be encoded does not have the aforementioned padding areas included therein. The decoded frame IMG' generated from the decoding circuit 120 does not have the padding areas included therein. The post-processing circuit 122 needs to perform the pixel padding operation at the decoder side for adding the required padding areas to the decoded frame IMG' before pixels of the decoded frame IMG' are processed by the interpolation filter 128.

Dealing with discontinuity edges that are neither vertical edges nor horizontal edges is not a simple task. Since the proposed octahedron projection layout 300/400/1100/1200 is composed of equilateral-triangle-shaped projection faces, any of picture boundaries (which are caused by filling of dummy areas) and/or image content discontinuity boundaries (which are caused by assembling of triangular projection faces) is a 60-degree edge. Since the proposed octahedron projection layout 800/1500 is composed of isosceles-right-triangle-shaped projection faces, any of image content discontinuity boundaries (which are caused by assembling of triangular projection faces) is a 45-degree edge. The 45-degree edge/60-degree edge can be observed to have a jagged shape when being zoomed in. In a case where 4:2:0 chroma subsampling is employed by the encoding circuit 114 for encoding the projection-based frame IMG, one chroma sample is shared by two luma samples. If the 45-degree edge/60-degree edge has a jagged shape with each jag being odd-pixel wide, it is possible that two luma samples (e.g., luma samples of horizontally adjacent pixels or luma samples of vertically adjacent pixels) associated with the 45-degree edge/60-degree edge are obtained from a dummy area and a triangular projection face, respectively (or obtained from adjacent triangular projection faces, respectively), and share a same chroma sample obtained from one of the dummy area and the triangular projection face (or one of the adjacent triangular projection faces). As a result, the 45-degree edge/60-degree edge in the decoded frame IMG' may have wrong colors. To address this issue, the present invention further proposes setting the width of each jag to be even-pixel wide.

Figure 23:
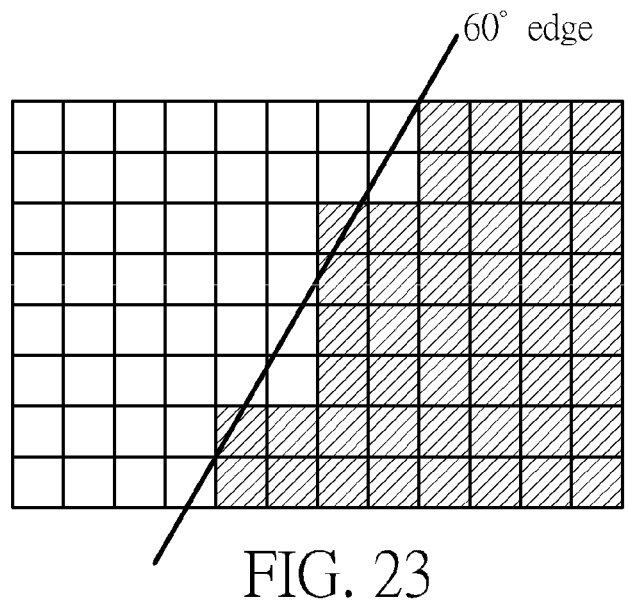
FIG. 23 is a diagram illustrating a 60-degree edge with each jag being even-pixel wide according to an embodiment of the present invention.

FIG. 23 is a diagram illustrating a 60-degree edge with each jag being even-pixel wide according to an embodiment of the present invention. When the octahedron projection layout L_OHP is set by any of the proposed octahedron projection layouts 300, 400, 1100, 1200, each of picture boundaries (which are caused by filling of dummy areas) and/or image content discontinuity boundaries (which are caused by assembling of triangular projection faces) is a 60-degree edge. Each block in FIG. 23 represents one pixel. If the 60-degree edge is a picture boundary, blank blocks belong to one of a dummy area and a triangular projection face, and shaded blocks belong to the other of the dummy area and the triangular projection face. If the 60-degree edge is an image content discontinuity boundary, blank blocks belong to one of adjacent triangular projection faces, and shaded blocks belong to the other of the adjacent triangular projection faces. In accordance with the proposed jag width constraint, each of picture boundaries and/or image content discontinuity boundaries in the projection-based frame IMG to be encoded is configured to have a jagged shape with each jag being even-pixel wide (e.g., 2-pixel wide or 4-pixel wide). In this way, two luma samples and the shared chroma sample are all obtained from the same dummy area or the same triangular projection face, thereby preventing the 60-degree edge from having wrong colors.

Figure 24:
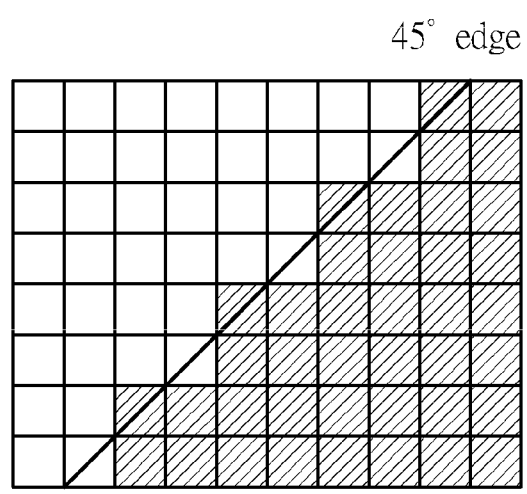
FIG. 24 is a diagram illustrating a 45-degree edge with each jag being even-pixel wide according to an embodiment of the present invention.

FIG. 24 is a diagram illustrating a 45-degree edge with each jag being even-pixel wide according to an embodiment of the present invention. When the octahedron projection layout L_OHP is set by any of the proposed octahedron projection layouts 800 and 1500, each of image content discontinuity boundaries (which are caused by assembling of triangular projection faces) is a 45-degree edge. Each block in FIG. 24 represents one pixel. The blank blocks belong to one of adjacent triangular projection faces, and the shaded blocks belong to the other of the adjacent triangular projection faces. In accordance with the proposed jag width constraint, each of image content discontinuity boundaries in the projection-based frame IMG to be encoded is configured to have a jagged shape with each jag being even-pixel wide (e.g., 2-pixel wide). In this way, two luma samples and the shared chroma sample are all obtained from the same triangular projection face, thereby preventing the 45-degree edge from having wrong colors.

The proposed octahedron projection layouts 300, 400, 800, 900, 1100, 1200, 1500, 1600 are for illustrative purposes only, and are not meant to be limitations of the present invention. In practice, an alternative octahedron projection layout may be obtained from applying a specific operation (e.g., face sequence adjustment, layout rotation, and/or layout mirroring) to any of the proposed octahedron projection layouts 300, 400, 800, 900, 1100, 1200, 1500, 1600. These alternative layout designs all fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for generating a projection-based frame, comprising:

receiving an omnidirectional video frame corresponding to a viewing sphere; and generating, by a conversion circuit, the projection-based frame according to the omnidirectional video frame and an octahedron projection layout, wherein the projection-based frame has a 360-degree image content represented by triangular projection faces assembled in the octahedron projection layout, and a 360-degree image content of the viewing sphere is mapped onto the triangular projection faces via an octahedron projection of the viewing sphere;

wherein the triangular projection faces assembled in the octahedron projection layout comprise a first triangular projection face, a second triangular projection face and a third triangular projection face, one side of the first triangular projection face has contact with one side of the second triangular projection face, one side of the third triangular projection face has contact with another side of the second triangular projection face, there is an image content continuity boundary between said one side of the first triangular projection face and said one side of the second triangular projection face, and there is an image content continuity boundary between said one side of the third triangular projection face and said another side of the second triangular projection face;

wherein the triangular projection faces of the octahedron projection layout are obtained from the octahedron projection of the viewing sphere according to an octahedron; a boundary between one side of a first face of the octahedron and one side of a second face of the octahedron corresponds to the image content continuity boundary between said one side of the first triangular projection face and said one side of the second triangular projection face, where said one side of the first face of the octahedron connects with said one side of the second face of the octahedron; and a boundary between one side of a third face of the octahedron and another side of the second face of the octahedron corresponds to the image content continuity boundary between said one side of the third triangular projection face and said another side of the second triangular projection face, where said one side of the third face of the octahedron connects with said another side of the second face of the octahedron.

2. The method of claim 1, wherein the triangular projection faces assembled in the octahedron projection layout further comprise a fourth triangular projection face, one side of the fourth triangular projection face has contact with yet another side of the second triangular projection face, and there is an image content continuity boundary between said one side of the fourth triangular projection face and said yet another side of the second triangular projection face.

3. The method of claim 1, wherein a shape of each of the triangular projection faces is an equilateral triangle.

4. The method of claim 3, wherein each of the triangular projection faces has a first side, a second side and a third side, and an equator of the viewing sphere is mapped along first sides of the triangular projection faces.

5. The method of claim 3, wherein an equator of the viewing sphere is not mapped along any side of each of the triangular projection faces.

6. The method of claim 3, wherein the viewing sphere is composed of a first hemisphere and a second hemisphere; and the first triangular projection face, the second triangular projection face and the third triangular projection face are all derived from the first hemisphere via the octahedron projection of the viewing sphere.

7. The method of claim 6, wherein the triangular projection faces assembled in the octahedron projection layout further comprise a fourth projection face derived from the first hemisphere via the octahedron projection of the viewing sphere, one side of the fourth triangular projection face has contact with another side of the third triangular projection face, and there is an image content discontinuity boundary between said one side of the fourth triangular projection face and said another side of the third triangular projection face.

8. The method of claim 6, wherein a shape of the octahedron projection layout is a rectangle, the triangular projection faces assembled in the octahedron projection layout further comprise a fourth projection face derived from the first hemisphere via the octahedron projection of the viewing sphere, the fourth projection face is split into a first right-triangle-shaped part and a second right-triangle-shaped part, the first right-triangle-shaped part has a first side being one side of the fourth projection face and a second side being a first part of another side of the fourth projection face, the second right-triangle-shaped part has a first side being yet another side of the fourth projection face and a second side being a second part of said another side of the fourth projection face, the first side of the second right-triangle-shaped part has contact with another side of the first triangular projection face, the first side of the first right-triangle-shaped part has contact with another side of the third triangular projection face, there is an image content discontinuity boundary between the first side of the second right-triangle-shaped part and said another side of the first triangular projection face, and there is an image content discontinuity boundary between the first side of the first right-triangle-shaped part and said another side of the third triangular projection face.

9. The method of claim 6, wherein the triangular projection faces assembled in the octahedron projection layout further comprise a fourth projection face derived from the first hemisphere via the octahedron projection of the viewing sphere, a first padding area extended from one side of the fourth triangular projection face has contact with a second padding area extended from another side of the third triangular projection face, the first padding area comprises padding pixels derived from boundary pixels of said one side of the fourth triangular projection face, the second padding area comprises padding pixels derived from boundary pixels of said another side of the third triangular projection face, and there is an image content discontinuity boundary between the first padding area and the second padding area.

10. The method of claim 6, wherein a shape of the octahedron projection layout is a rectangle, the triangular projection faces assembled in the octahedron projection layout further comprise a fourth projection face derived from the first hemisphere via the octahedron projection of the viewing sphere, the fourth projection face is split into a first right-triangle-shaped part and a second right-triangle-shaped part, the first right-triangle-shaped part has a first side being one side of the fourth projection face and a second side being a first part of another side of the fourth projection face, the second right-triangle-shaped part has a first side being yet another side of the fourth projection face and a second side being a second part of said another side of the fourth projection face, a first padding area is extended from the first side of the second right-triangle-shaped part has contact with a second padding area that is extended from another side of the first triangular projection face, a third padding area is extended from the first side of the first right-triangle-shaped part and has contact with a fourth padding area that is extended from another side of the third triangular projection face, the first padding area comprises padding pixels derived from boundary pixels of the first side of the second right-triangle-shaped part, the second padding area comprises padding pixels derived from boundary pixels of said another side of the first triangular projection face, the third padding area comprises padding pixels derived from boundary pixels of the first side of the first right-triangle-shaped part, the fourth padding area comprises padding pixels derived from boundary pixels of said another side of the third triangular projection face, there is an image content discontinuity boundary between the first padding area and the second padding area, and there is an image content discontinuity boundary between the third padding area and the fourth padding area.

11. The method of claim 3, wherein the viewing sphere is composed of a first hemisphere and a second hemisphere; the first triangular projection face and the second triangular projection face are both derived from the first hemisphere via the octahedron projection of the viewing sphere, and the third triangular projection face is derived from the second hemisphere via the octahedron projection of the viewing sphere.

12. The method of claim 1, wherein a shape of each of the triangular projection faces is an isosceles right triangle.

13. The method of claim 12, wherein each of the triangular projection faces has a first side, a second side and a third side, and an equator of the viewing sphere is mapped along first sides of the triangular projection faces.

14. The method of claim 12, wherein an equator of the viewing sphere is not mapped along any side of each of the triangular projection faces.

15. The method of claim 12, wherein the viewing sphere is composed of a first hemisphere and a second hemisphere; and the first triangular projection face, the second triangular projection face and the third triangular projection face are all derived from the first hemisphere via the octahedron projection of the viewing sphere.

16. The method of claim 15, wherein a shape of the octahedron projection layout is a rectangle, the first triangular projection face is split into a first right-triangle-shaped part and a second right-triangle-shaped part that are assembled in the octahedron projection layout with different orientations respectively, the first right-triangle-shaped part has a first side being said one side of the first projection face and a second side being a first part of another side of the first projection face, the second right-triangle-shaped part has a first side being yet another side of the first projection face and a second side being a second part of said another side of the first projection face, the third triangular projection face is split into a third right-triangle-shaped part and a fourth right-triangle-shaped part that are assembled in the octahedron projection layout with different orientations respectively, the third right-triangle-shaped part has a first side being said one side of the third projection face and a second side being a first part of another side of the third projection face, and the fourth right-triangle-shaped part has a first side being yet another side of the third projection face and a second side being a second part of said another side of the third projection face.

17. The method of claim 15, wherein a shape of the octahedron projection layout is a rectangle, the triangular projection faces assembled in the octahedron projection layout further comprise a fourth triangular projection face derived from the first hemisphere via the octahedron projection of the viewing sphere, one side of the fourth triangular projection face has contact with another side of the first triangular projection face, another side of the fourth triangular projection face has contact with another side of the third triangular projection face, there is an image content continuity boundary between said one side of the fourth triangular projection face and said another side of the first triangular projection face, and there is an image content continuity boundary between said another side of the fourth triangular projection face and said another side of the third triangular projection face.

18. The method of claim 1, wherein at least one picture boundary resulting from filling of dummy areas in the projection-based frame or at least one image content discontinuity boundary resulting from assembling of the triangular projection faces in the octahedron projection layout has a jagged shape with each jag being even-pixel wide.

19. The method of claim 12, wherein the viewing sphere is composed of a first hemisphere and a second hemisphere; the first triangular projection face and the second triangular projection face are both derived from the first hemisphere via the octahedron projection of the viewing sphere, and the third triangular projection face is derived from the second hemisphere via the octahedron projection of the viewing sphere.

20. A processing circuit for generating a projection-based frame, comprising:
an input interface, arranged to receive an omnidirectional video frame corresponding to a viewing sphere; and
a conversion circuit, arranged to generate the projection-based frame according to the omnidirectional video frame and an octahedron projection layout, wherein the projection-based frame has a 360-degree image content represented by triangular projection faces assembled in the octahedron projection layout, and a 360-degree image content of the viewing sphere is mapped onto the triangular projection faces via an octahedron projection of the viewing sphere;
wherein the triangular projection faces assembled in the octahedron projection layout comprise a first triangular projection face, a second triangular projection face and a third triangular projection face, one side of the first triangular projection face has contact with one side of the second triangular projection face, one side of the third triangular projection face has contact with another side of the second triangular projection face, there is an image content continuity boundary between said one side of the first triangular projection face and said one side of the second triangular projection face, and there is an image content continuity boundary between said one side of the third triangular projection face and said another side of the second triangular projection face;
wherein the triangular projection faces of the octahedron projection layout are obtained from the octahedron projection of the viewing sphere according to an octahedron; a boundary between one side of a first face of the octahedron and one side of a second face of the octahedron corresponds to the image content continuity boundary between said one side of the first triangular projection face and said one side of the second triangular projection face, where said one side of the first face of the octahedron connects with said one side of the second face of the octahedron; and a boundary between one side of a third face of the octahedron and another side of the second face of the octahedron corresponds to the image content continuity boundary between said one side of the third triangular projection face and said another side of the second triangular projection face, where said one side of the third face of the octahedron connects with said another side of the second face of the octahedron.

* * * * *